United States Patent
Jeong et al.

(10) Patent No.: US 10,366,512 B2
(45) Date of Patent: Jul. 30, 2019

(54) AROUND VIEW PROVISION APPARATUS AND VEHICLE INCLUDING THE SAME

(71) Applicant: LG ELECTRONICS INC., Seoul (KR)

(72) Inventors: Boyoung Jeong, Seoul (KR); Alexey Rozhkov, Seoul (KR); Denis Timoshenko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/479,212

(22) Filed: Apr. 4, 2017

(65) Prior Publication Data

US 2017/0287168 A1    Oct. 5, 2017

(30) Foreign Application Priority Data

Apr. 4, 2016  (KR) ................ 10-2016-0041033

(51) Int. Cl.
*H04N 7/18*         (2006.01)
*G06T 7/80*         (2017.01)
(Continued)

(52) U.S. Cl.
CPC ............... *G06T 7/80* (2017.01); *B60K 35/00* (2013.01); *B60R 1/00* (2013.01); *G06T 3/4038* (2013.01);
(Continued)

(58) Field of Classification Search
CPC .................... G06T 7/80; B60K 35/00
See application file for complete search history.

(56) References Cited

U.S. PATENT DOCUMENTS

2007/0268118 A1    11/2007  Watanabe et al.
2008/0094480 A1*    4/2008  Swarr ............. G08B 13/19689
                                              348/211.99
(Continued)

FOREIGN PATENT DOCUMENTS

CN          105096655        11/2015
EP            2955915        12/2015
(Continued)

OTHER PUBLICATIONS

Korean Intellectual Property Office Application No. 10-2016-0041033, Office Action dated May 9, 2018, 6 pages.
(Continued)

*Primary Examiner* — William C Vaughn, Jr.
*Assistant Examiner* — Jerry T Jean Baptiste
(74) *Attorney, Agent, or Firm* — Lee, Hong, Degerman, Kang & Waimey

(57) ABSTRACT

Disclosed herein are an around view provision apparatus and a vehicle including the same. The around view provision apparatus includes a plurality of cameras mounted on a vehicle, a display, and a processor configured to receive a plurality of images from the plurality of cameras, to check locations of the images using first area patterns in the plurality of images, to compensate a parameter in an image using second area patterns located in overlapping areas between the plurality of images, and to generate an around view image based on the compensated parameter. Accordingly, it is possible to provide an accurate around view image based on a calibrated image.

16 Claims, 21 Drawing Sheets

(51) Int. Cl.
*G06T 11/60* (2006.01)
*H04N 9/31* (2006.01)
*G06T 7/73* (2017.01)
*B60R 1/00* (2006.01)
*B60K 35/00* (2006.01)
*G06T 3/40* (2006.01)

(52) U.S. Cl.
CPC ............... *G06T 7/74* (2017.01); *G06T 11/60* (2013.01); *H04N 7/181* (2013.01); *H04N 9/3179* (2013.01); *B60K 2350/2052* (2013.01); *B60R 2300/105* (2013.01); *B60R 2300/303* (2013.01); *B60R 2300/304* (2013.01); *B60R 2300/402* (2013.01); *G06T 2207/10016* (2013.01); *G06T 2207/30264* (2013.01)

(56) References Cited

U.S. PATENT DOCUMENTS

| | | | |
|---|---|---|---|
| 2014/0036063 A1 | 2/2014 | Kim et al. | |
| 2014/0098229 A1* | 4/2014 | Lu | H04N 7/181 348/148 |
| 2015/0329048 A1* | 11/2015 | Wang | G06T 7/80 348/148 |
| 2016/0048966 A1* | 2/2016 | Kuehnle | G06T 5/50 348/38 |

FOREIGN PATENT DOCUMENTS

| | | |
|---|---|---|
| JP | 2006311222 | 11/2006 |
| KR | 1020110055412 | 5/2011 |
| KR | 1020130056605 | 5/2013 |
| KR | 1020150141804 | 12/2015 |
| KR | 1020150144090 | 12/2015 |
| KR | 1020160034059 | 3/2016 |

OTHER PUBLICATIONS

European Patent Office Application Serial No. 17164753.0, Search Report dated Jul. 5, 2017, 6 pages.
Korean Intellectual Property Office Application No. 10-2016-0041033, Office Action dated Nov. 21, 2017, 5 pages.
The State Intellectual Property Office of the People's Republic of China Application Serial No. 201710218269.0, Office Action dated Dec. 29, 2018, 19 pages.

\* cited by examiner (a)    (b)

(a)  (b)

AROUND VIEW PROVISION APPARATUS AND VEHICLE INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2016-0041033 filed on Apr. 4, 2016, the contents of which are hereby incorporated by reference herein in its entirety.

BACKGROUND OF THE INVENTION

1. Field of the Invention

The present invention relates to an around view provision apparatus and a vehicle including the same, and more particularly, to an around view provision apparatus capable of providing an accurate around view image based on a calibrated image, and a vehicle including the same.

2. Description of the Related Art

A vehicle is an apparatus that allows a user who rides therein to drive the apparatus in a desired direction. A representative example of the vehicle may be an automobile.

Meanwhile, for convenience of the user who uses the vehicle, the vehicle is provided with, for example, various sensors and electronic devices. In particular, for example, various devices for user driving convenience are being developed. Upon reversing or parking a vehicle, an image captured through a rear camera is being provided.

SUMMARY OF THE INVENTION

An object of the present invention devised to solve the problem lies in an around view provision apparatus capable of providing an accurate around view image based on a calibrated image, and a vehicle including the same.

The object of the present invention can be achieved by providing an around view provision apparatus including a plurality of cameras mounted on a vehicle, a display, and a processor configured to receive a plurality of images from the plurality of cameras, to check locations of the images using first area patterns in the plurality of images, to compensate a parameter in an image using second area patterns located in overlapping areas between the plurality of images, and to generate an around view image based on the compensated parameter.

In another aspect of the present invention, provided herein is a vehicle including a steering drive unit to drive a steering apparatus, a brake drive unit to drive a brake apparatus, a power source drive unit to drive a power source, a plurality of cameras mounted on the vehicle, a display, and a processor configured to receive a plurality of images from the plurality of cameras, to check locations of the images using first area patterns in the plurality of images, to compensate a parameter in an image using second area patterns located in overlapping areas between the plurality of images, and to generate an around view image based on the compensated parameter.

DETAILED DESCRIPTION OF THE EMBODIMENTS

Hereinafter, the present invention will be described in detail with reference to the accompanying drawings.

With respect to constituent elements used in the following description, suffixes "module" and "unit" are given or mingled with each other only in consideration of ease in preparation of the specification, and do not have or serve as different meanings. Accordingly, the terms "module" and "unit" may be used interchangeably.

A vehicle as described in this specification may include an automobile and a motorcycle. Hereinafter, an automobile will be focused upon.

A vehicle as described in this specification may include all of a vehicle including an engine, a hybrid vehicle including both an engine and an electric motor, and an electric vehicle including an electric motor.

An around view provision apparatus as described in this specification may include an apparatus which includes a plurality of cameras and synthesizes a plurality of images captured by the plurality of cameras to provide an around view image. In particular, the apparatus may provide a top view or a bird eye view based on a vehicle. Hereinafter, an around view provision apparatus and a vehicle including the same according to various embodiments of the present invention will be described.

Figure 1:
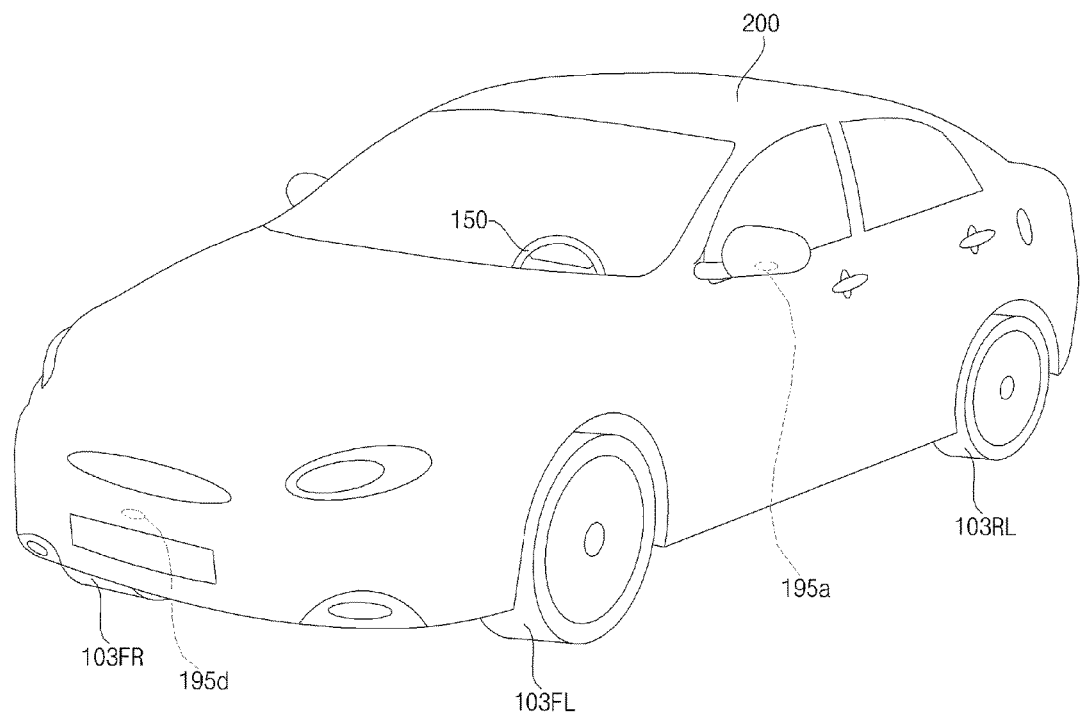
FIG. 1 is a diagram showing the appearance of a vehicle including around view cameras according to one embodiment of the present invention.

FIG. 1 is a diagram showing the appearance of a vehicle including around view cameras according to one embodiment of the present invention.

Referring to FIG. 1, a vehicle 200 may include wheels 103FR, 103FL, 103RL, . . . rotated by a power source, a steering wheel 150 for controlling the direction of travel of the vehicle 200, and a plurality of around view cameras

195a, 195b, 195c and 195d mounted on the vehicle 200. In FIG. 1, for convenience, only a left camera 195a and a front camera 195d are shown.

The plurality of around view cameras 195a, 195b, 195c and 195d may be activated when the speed of the vehicle is equal to or less than a predetermined speed or if the vehicle is propelled, thereby acquiring respective captured images. The images acquired by the plurality of cameras may be processed in the around view provision apparatus (100 of FIG. 3A or 3B).

Figure 2A:
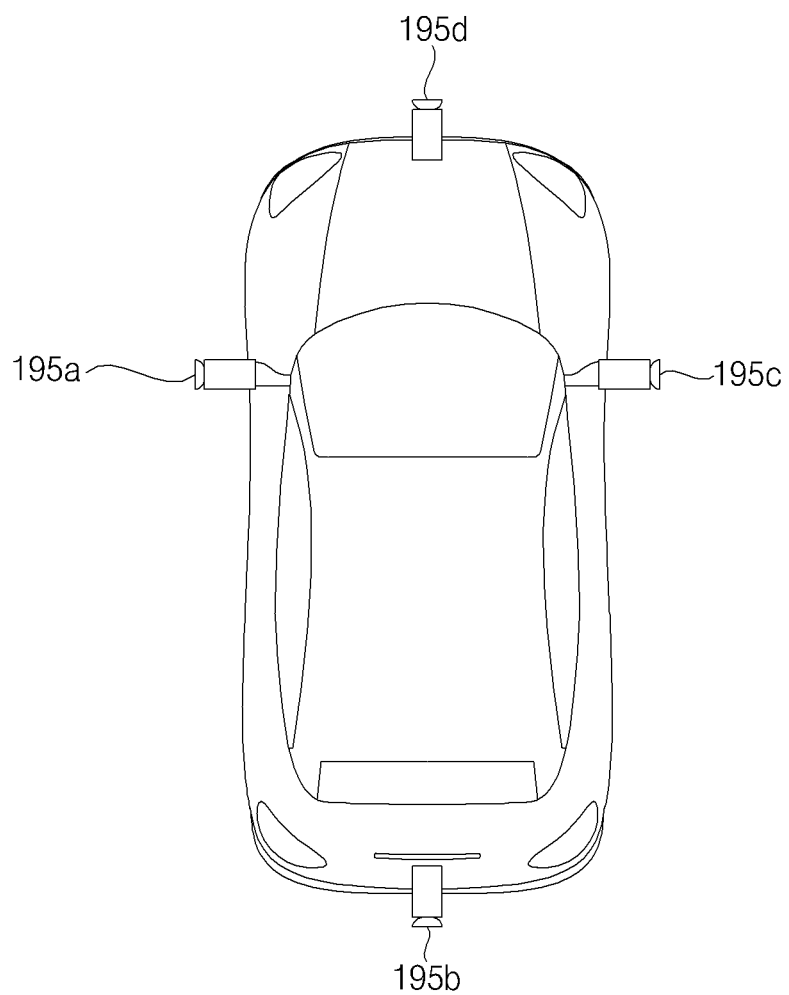
FIG. 2A is a schematic diagram showing the positions of the around view cameras attached to the vehicle of FIG. 1.
Figure 2B:
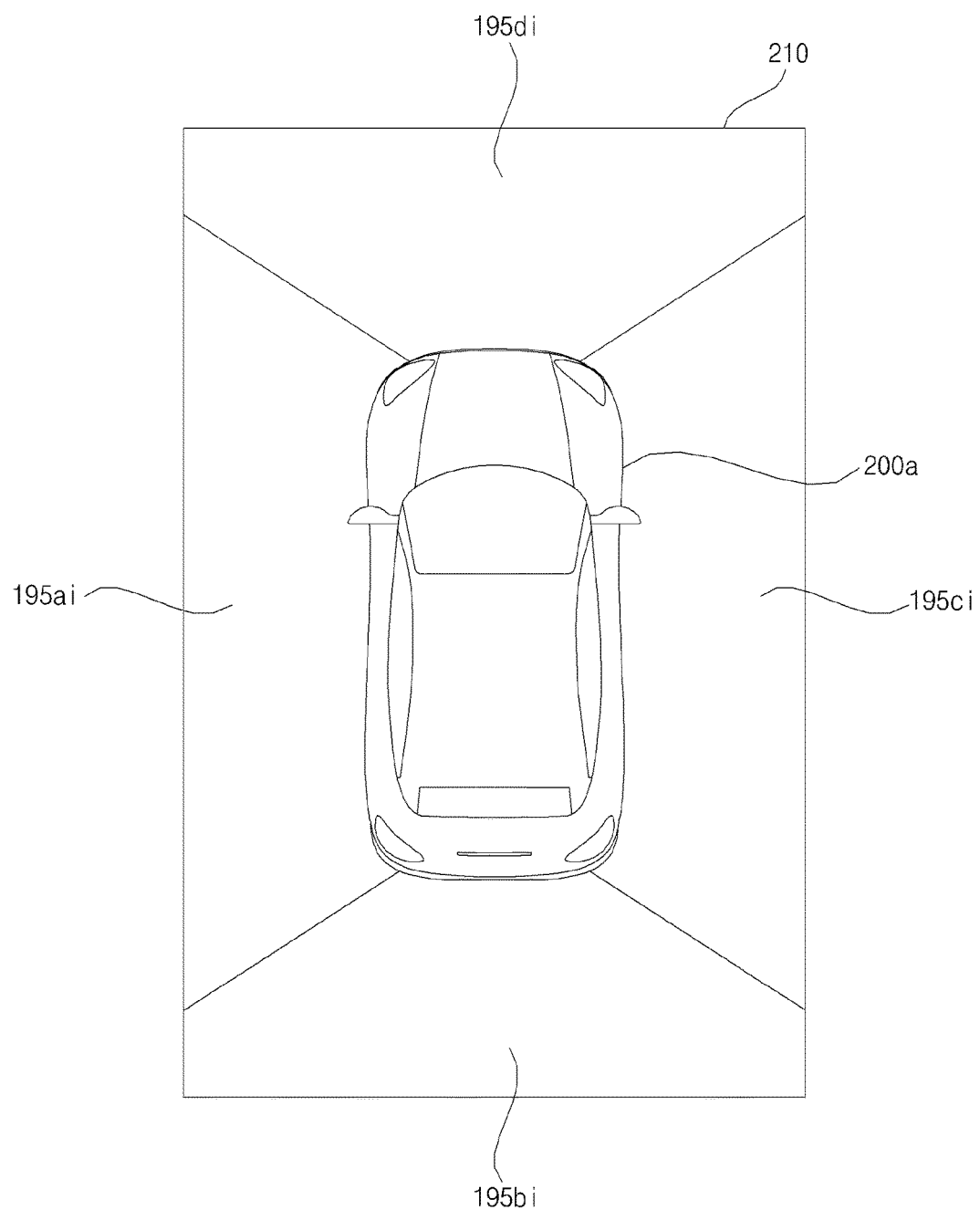
FIG. 2B is a diagram showing an around view image based on images captured by the around view cameras of FIG. 2A.

FIG. 2A is a schematic diagram showing the positions of the around view cameras attached to the vehicle of FIG. 1, and FIG. 2B is a diagram showing an around view image based on images captured by the around view cameras of FIG. 2A.

First, referring to FIG. 2A, the plurality of around view cameras 195a, 195b, 195c and 195d may be disposed at the front, rear, right and left sides of the vehicle, respectively.

In particular, the left camera 195a and the right camera 915c may be disposed in a case surrounding a left side-view mirror and a case surrounding a right side-view mirror, respectively.

The rear camera 195b and the front camera 195d may be disposed near a trunk switch or on or near an emblem.

The plurality of images captured by the plurality of around view cameras 195a, 195b, 195c and 195d is delivered to a processor (170 of FIG. 3A or 3B) of the vehicle 200 and the processor (170 of FIG. 3A or 3B) synthesizes the plurality of images to generate an around view image.

FIG. 2B shows an example of the around view image 210. The around view image 210 may include a first image area 195ai of the left camera 195a, a second image area 195bi of the rear camera 195b, a third image area 195ci of the right camera 195c and a fourth image area 195di of the front camera 195d.

Figure 3A:
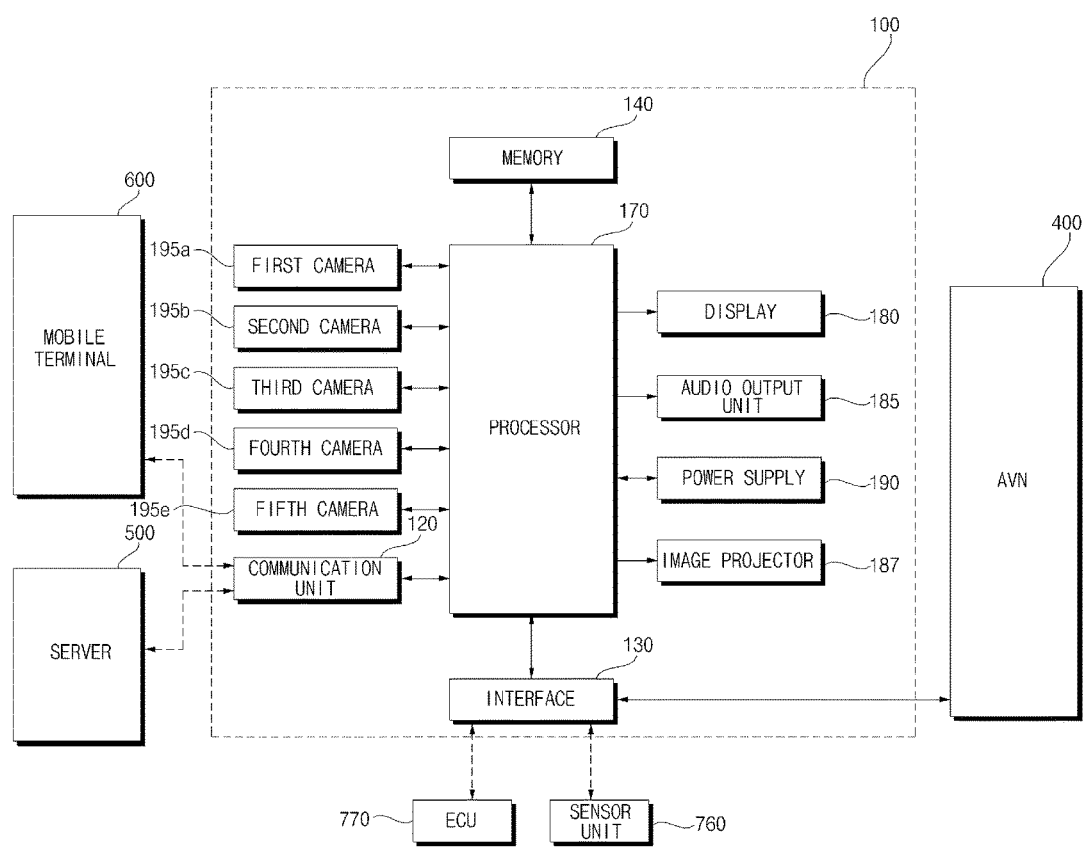
FIGS. 3A and 3B are block diagrams showing various examples of the internal configuration of an apparatus for providing an around view according to one embodiment of the present invention.
Figure 3B:
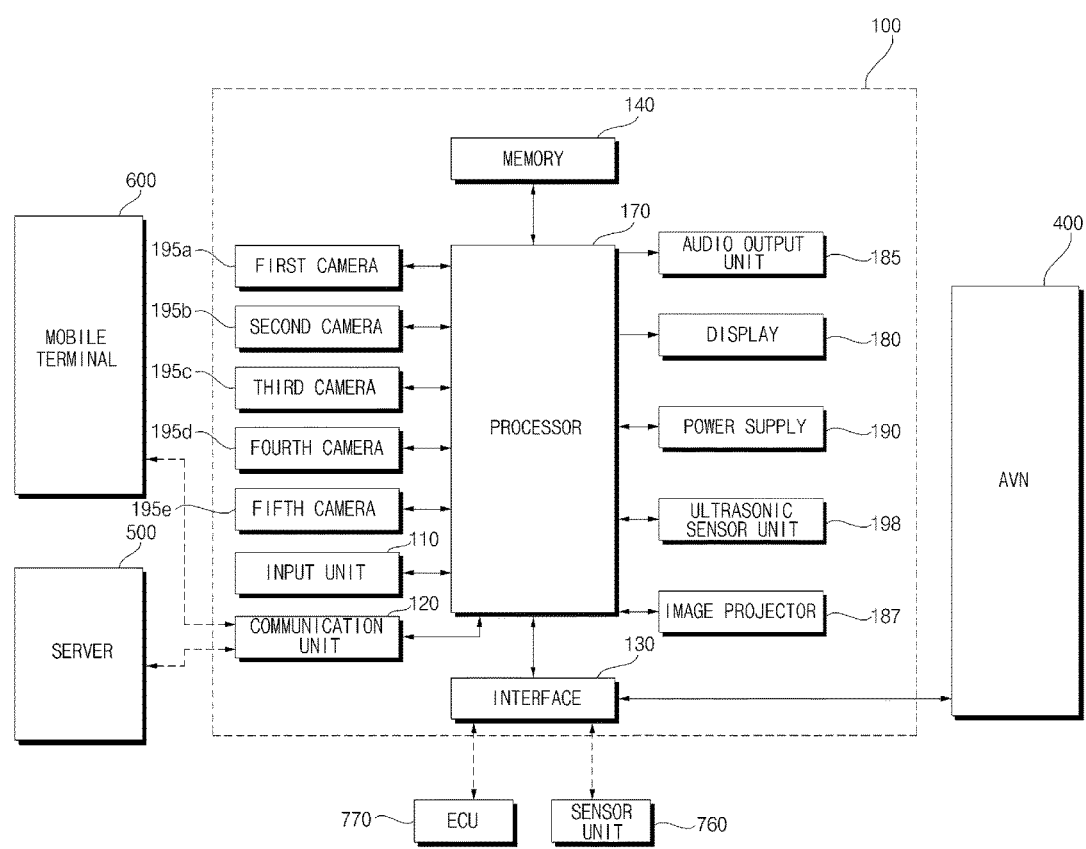

FIGS. 3A to 3B are block diagrams showing various examples of the internal configuration of an around view provision apparatus according to one embodiment of the present invention.

The around view provision apparatus 100 of FIG. 3A or 3B may synthesize the plurality of images received from the plurality of around view cameras 195a, 195b, 195c and 195d to generate the around view image.

The around view provision apparatus 100 may detect, verify and track an object located near the vehicle based on the plurality of images received from the plurality of around view cameras 195a, 195b, 195c and 195d.

First, referring to FIG. 3A, the around view provision apparatus 100 of FIG. 3A may include a communication unit 120, an interface 130, a memory 140, a processor 170, a display 180, an audio output unit 185, a power supply 190 and a plurality of cameras 195a, . . . , 195e. In addition, an audio input unit (not shown) and an image projector 187 for projecting an image to the outside of the vehicle may be further included.

The communication unit 120 may exchange data with a mobile terminal 600 or a server 500 in a wireless manner. In particular, the communication unit 120 may exchange data with the mobile terminal of the driver in a wireless manner. The wireless communication method may include various data communication methods such as BLUETOOTH, Wi-Fi Direct, Wi-Fi or APiX.

The communication unit 120 may receive weather information and road traffic state information, e.g., Transport Protocol Experts Group (TPEG) information, from the mobile terminal 600 or the server 500. In the around view provision apparatus 100, real-time traffic information obtained based on the images may be transmitted to the mobile terminal 600 or the server 500.

When a user gets into the vehicle 100, the mobile terminal 600 of the user and the around view provision apparatus 100 may pair with each other automatically or as the user executes an application.

The interface 130 may receive vehicle related data or transmit signals processed or generated in the processor 170 to an external device. The interface 130 may perform data communication with an ECU 770, an audio video navigation (AVN) apparatus 400 and a sensor unit 760 using a wired or wireless communication method.

The interface 130 may receive map information related to vehicle traveling through data communication with the AVN apparatus 400.

The interface 130 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

Information related to vehicle traveling, such as vehicle direction information, vehicle position information, vehicle angle information, vehicle speed information and vehicle tilt information, may be referred to as vehicle traveling information.

The memory 140 may store a variety of data for overall operation of the around view provision apparatus 100, such as a program for processing or control of the processor 170.

An audio output unit (not shown) converts an electrical signal from the processor 170 into an audio signal and outputs the audio signal. The audio output unit may include a speaker. The audio output unit 185 may output sound corresponding to operation of the input unit 110, that is, a button.

An audio input unit (not shown) may receive user voice and may include a microphone. The received voice may be converted into an electrical signal and the electrical signal may be delivered to the processor 170.

The processor 170 controls overall operation of the units of the around view provision apparatus 100.

In particular, the processor 170 may acquire a plurality of images from the plurality of cameras 195a, 195b, 195c and 195d and synthesize the plurality of images to generate an around view image.

The processor 170 may perform signal processing based on computer vision. For example, the processor may perform disparity calculation of the periphery of the vehicle based on the plurality of images or the generated around view image, perform object detection within the image based on the calculated disparity information, and continuously track motion of an object after object detection.

In particular, the processor 170 may perform lane detection, peripheral vehicle detection, pedestrian detection, traffic sign detection, road surface detection, etc. upon object detection.

The processor 170 may calculate a distance from a detected peripheral vehicle or pedestrian.

The processor 170 may receive sensor information from the ECU 770 or the sensor unit 760 through the interface 130. The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

The display 180 may display the around view image generated by the processor 170. Upon displaying the around view image, various user interfaces may be provided and a touch sensor for enabling touch input through the provided user interface may be included.

The display 180 may include a cluster or a head up display (HUD) located at the internal front side of the vehicle. When the display 180 is a HUD, a projection module for projecting an image on the windshield of the vehicle 200 may be included.

The audio output unit 185 may output sound based on the audio signal processed by the processor 170. The audio output unit 185 may include at least one speaker.

The image projector 187 may output a projected image to the outside of the vehicle. In particular, the projected image may be output up to about 50 meters ahead. As a light source, a laser diode having good linearity may be used.

Alternatively, the image projector 187 may output a plurality of pattern images to the periphery of the vehicle, for calibration of the around view image upon parking the vehicle.

The image projector 187 may include a laser diode (210 of FIG. 4A) for outputting visible light corresponding to the projected image. For control of the output direction, output angle, output distance, etc. of the projected image, a scanner (240 of FIG. 4A) for externally outputting visible light using a scanning method may be further included.

The image projector 187 may output the projected image to the road surface located outside the vehicle or an object located near the vehicle, such as a wall, such that a driver views the projected image.

The image projector 187 may output the projected image to a fixed object, instead of a moving object, in order to prevent the field of vision of a driver of an oncoming vehicle from being obstructed.

The output direction, output angle, output distance, etc. of the projected image may be controlled by the processor 170 based on the sensed object.

The power supply 190 may supply power required to operate the respective components under control of the controller 170. In particular, the power supply 190 may receive power from, for example, a battery (not illustrated) inside the vehicle.

The plurality of cameras 195a, 195b, 195c and 195d may be wide angle cameras in order to provide the around view image.

The camera 195e is mounted inside the vehicle to capture a user, that is, a driver. The processor 170 may check the location of the driver based on the image from the indoor camera 195e, set blind spots through side-view mirrors or a rearview mirror in the vehicle, tilt at least some of the cameras to capture the blind spots, and operate in a blind spot detection (BSD) mode as a first mode.

Next, referring to FIG. 3B, the around view provision apparatus 100 of FIG. 3B is similar to the around view provision apparatus 100 of FIG. 3A but is different therefrom in that an input unit 110 and an ultrasonic sensor unit 198 are further included. Hereinafter, only the input unit 110 and the ultrasonic sensor units 198 will be described.

The input unit 110 may include a plurality of buttons attached near the display 180 or a touchscreen provided on the display 180. Through the plurality of buttons or the touchscreen, the around view provision apparatus 100 may be powered on. In addition, a variety of input operations may be performed.

The ultrasonic sensor unit 198 may include a plurality of ultrasonic sensors. If the plurality of ultrasonic sensors is mounted in the vehicle, an object located near the vehicle may be sensed based on a difference between a transmitted ultrasonic wave and a received ultrasonic wave.

Unlike FIG. 3B, a Lidar (not shown) may be included instead of the ultrasonic sensor unit 198 or the ultrasonic sensor unit 198 and the Lidar may be included.

Figure 4A:
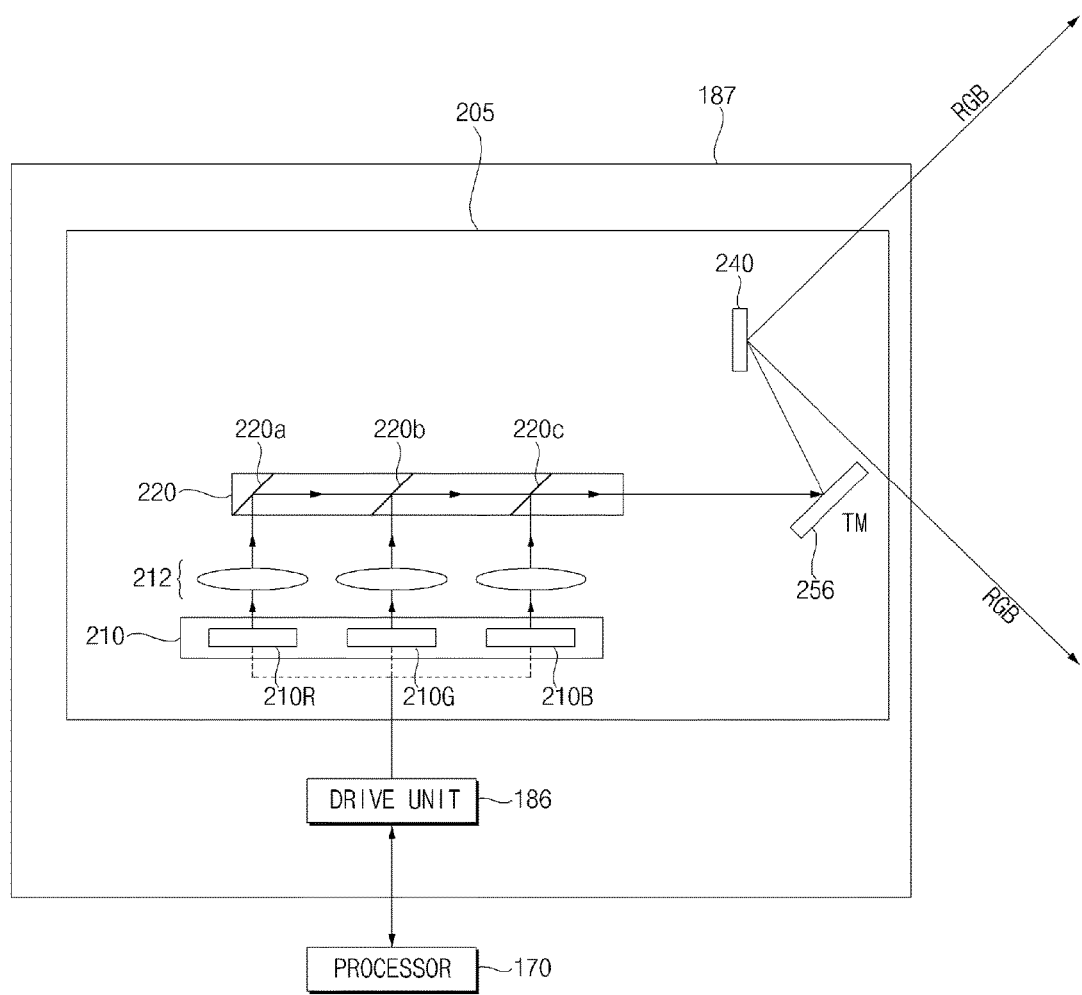
FIG. 4A is a block diagram showing an example of the internal configuration of an image projector of the around view provision apparatus of FIG. 3A or 3B.

FIG. 4A is a block diagram showing an example of the internal configuration of the image projector of the around view provision apparatus of FIG. 3A or 3B.

Referring to the figure, the image projector 187 of FIG. 4A includes an optical unit 205 and a drive unit 186.

The optical unit 205 may include a light source unit 210 including a plurality of light sources. That is, a red light source unit 210R, a green light source unit 210G and a blue light source unit 210B may be included. At this time, the red light source unit 210R, the green light source unit 210G and the blue light source unit 210B may include red, green and blue laser diodes, respectively.

The light source units 210R, 210G and 210B may be driven by electrical signals from the drive unit 185 and the electrical signals of the drive unit 185 may be generated under control of the processor 170.

The red, green and blue lights output from the light source units 210R, 210G and 210B are collimated through collimator lenses of the collimator 212.

A photosynthetic unit 220 synthesizes the lights output from the light source units 210R, 210G and 210B and outputs the synthesized light in one direction. The photosynthetic unit 220 includes three 2D MEMS mirrors 220a, 220b and 220c.

That is, the first photosynthetic unit 220a, the second photosynthetic unit 220b and the third photosynthetic unit 220c output red light output from the red light source unit 210R, green light output from the green light source unit 210G and blue light output from the blue light source 210B toward the scanner 240, respectively.

A light reflection unit 256 reflects the red, green and blue lights passing through the photosynthetic unit 220 toward the scanner 240. The light reflection unit 256 reflects lights having various wavelengths and thus may be implemented as a total mirror (TM).

The scanner 240 may receive visible light (RGB) based on the red, green and blue lights from the light source unit 210 and may sequentially and repeatedly perform first-direction scanning and second-direction scanning. Such scanning operations may be repeatedly performed with respect to an external scan area. Therefore, a projected image corresponding to visible light (RGB) may be externally displayed.

Figure 4B:
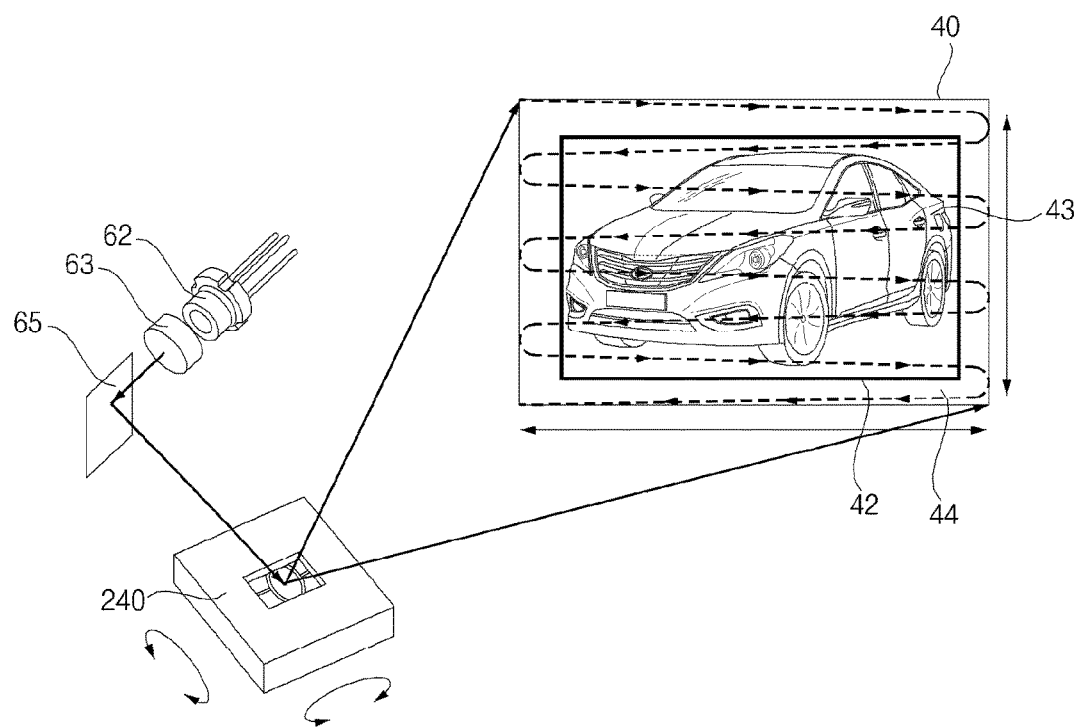
FIG. 4B is a diagram showing a scanning method upon image projection of the image projector of FIG. 4A.

FIG. 4B is a diagram showing a scanning method upon image projection of the image projector of FIG. 4A.

Referring to FIG. 4B, a light output unit 60 may include a laser diode 62, a mirror 65 and a scanner 240.

The wavelength of light output from the light output unit 60 may correspond to the wavelength of visible light.

Visible light output from the laser diode 62 may be reflected and scattered by the mirror 65 and input to the scanner 240.

The scanner 240 may receive visible light from the mirror and sequentially and repeatedly perform first-direction scanning and second-direction scanning.

As shown in FIG. 4B, the scanner 240 may perform left-to-right scanning or right-to-left scanning in a diagonal direction or a horizontal direction with respect to the external area 40 based on a scan-capable area. Such scanning operations may be repeatedly performed with respect to the whole of the external area 40.

By such scanning operations, the projected image may be externally output.

The external area 40 may be divided into a first area 42 and a second area 44, as shown in FIG. 4B. The first area 42 may be an area including an external object 43, that is, an active area, and the second area 44 may be an area without an external object, that is, a blank area.

Therefore, an entire scanning area may be divided into a first scanning area corresponding to the active area 42 including the external object and a second scanning area corresponding to the blank area 44 without the external object.

Figure 5A:
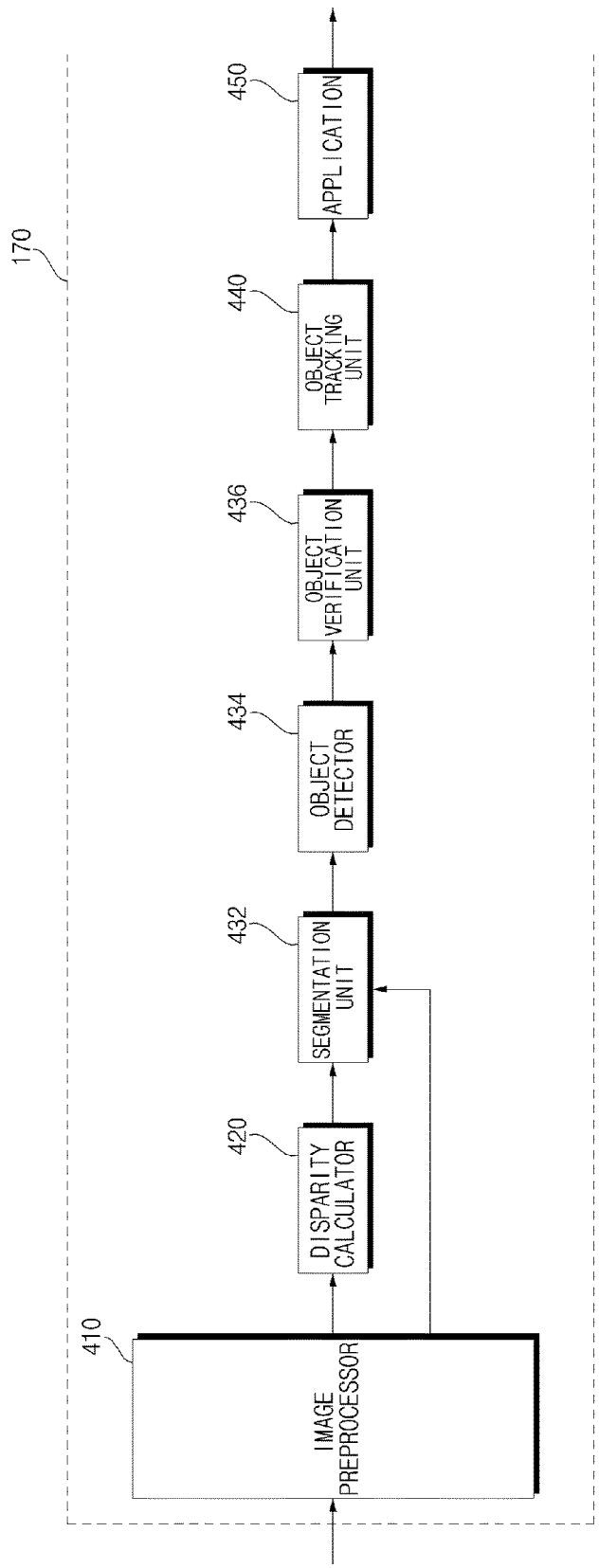
FIGS. 5A and 5B are block diagrams showing the internal configuration of the processor of FIGS. 3A and 3B.
Figure 5B:
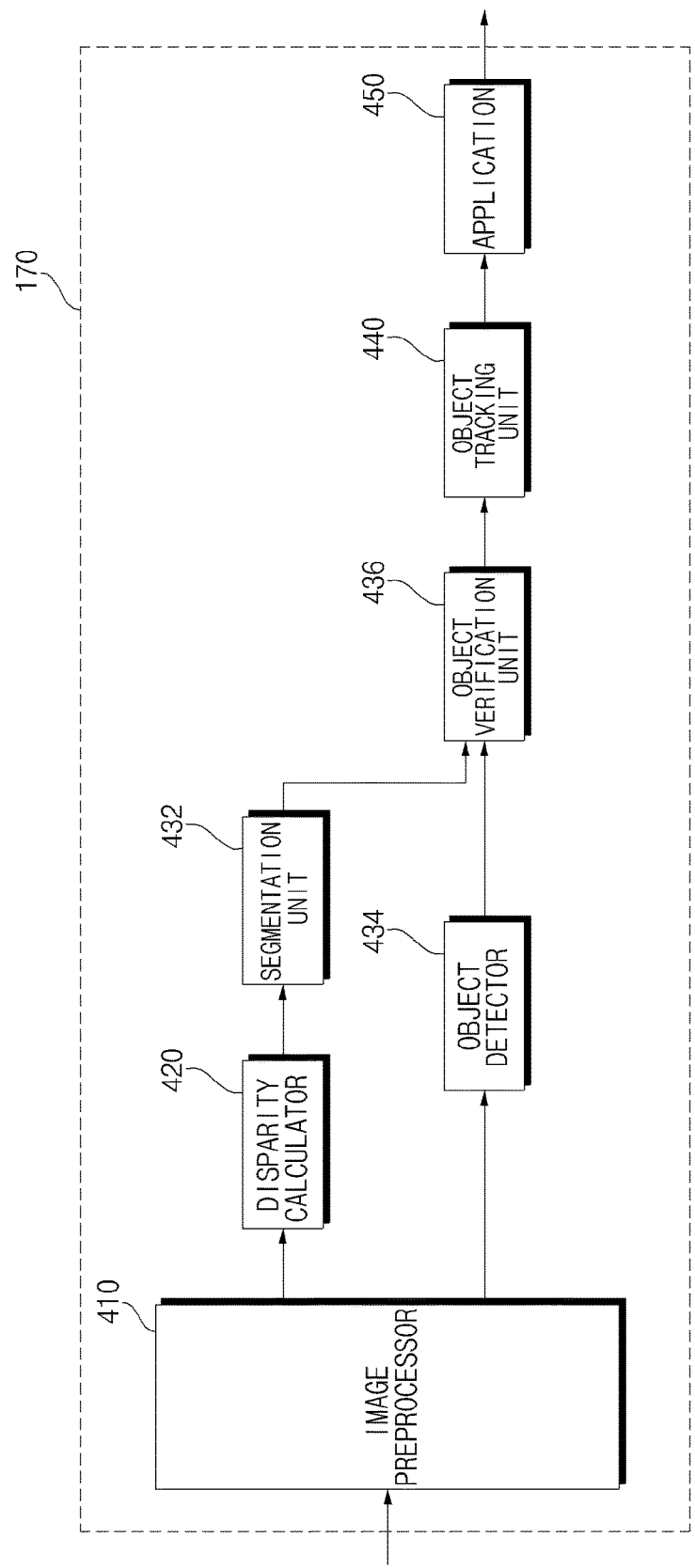
Figure 6:
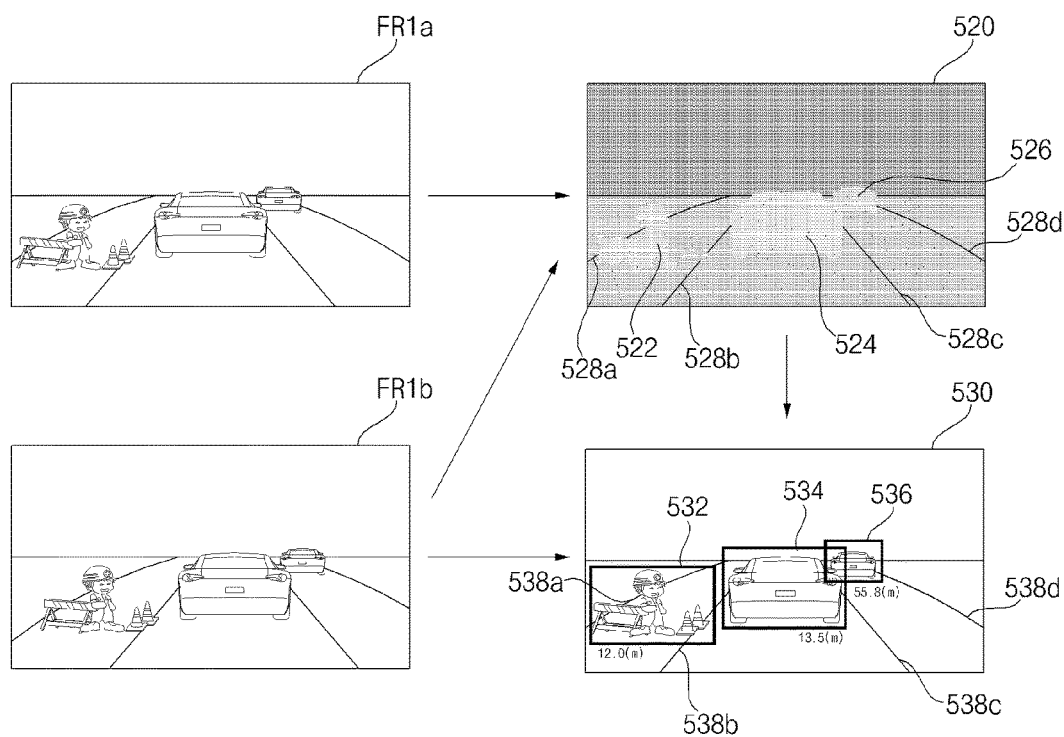
FIG. 6 is a diagram showing object detection in the processor of FIG. 5A or 5B.

FIGS. 5A to 5B are block diagrams the internal configuration of the processor of FIGS. 3A and 3B, and FIG. 6 is a diagram showing object detection in the processor of FIG. 5A or 5B.

FIG. 5A is a block diagram showing an example of the internal configuration of the processor 170. Referring to FIG. 5A, the processor 170 of the around view provision apparatus 100 may include an image pre-processor 410, a disparity calculator 420, a segmentation unit 432, an object detector 434, an object verification unit 436, an object tracking unit 440 and an application 450.

The image preprocessor 410 receives the plurality of images from the plurality of cameras 195a, 195b, 195c and 195d or the generated around view image and performs preprocessing.

More specifically, the image preprocessor 410 may perform noise reduction, rectification, calibration, color enhancement, color space conversion (CSC), interpolation, camera gain control, etc. with respect to the plurality of images or the generated around view image. Therefore, it is possible to acquire images having higher definition than that of the images captured by the plurality of cameras 195a, 195b, 195c and 195d or the generated around view image.

The disparity calculator 420 receives the plurality of images or the generated around view image processed by the image preprocessor 410, performs stereo matching with respect to the plurality of images sequentially received during a predetermined time or the generated around view image, and acquires a disparity map according to stereo matching. That is, it is possible to acquire disparity information of the periphery of the vehicle.

At this time, stereo matching may be performed in pixel units of the stereo images or predetermined block units. The disparity map may mean a map numerically expressing the binocular parallax information of the images, that is, left and right images.

The segmentation unit 432 may perform segmentation and clustering with respect to the images based on the disparity information from the disparity calculator 420.

More specifically, the segmentation unit 432 may segment a background and a foreground with respect to at least one of the images based on the disparity information.

For example, a region having disparity information of a predetermined value or less in the disparity map may be calculated as the background and be excluded. Therefore, the foreground may be segmented.

As another example, a region having disparity information of a predetermined value or more in the disparity map may be calculated as the foreground and be extracted. Therefore, the background may be segmented.

The foreground and the background may be segmented based on the disparity information extracted based on the images, thereby reducing a signal processing speed, the amount of processed signals, etc. upon subsequent object detection.

Next, the object detector 434 may detect an object based on image segmentation of the segmentation unit 432.

That is, the object detector 434 may detect an object from at least one of the images based on the disparity information.

More specifically, the object detector 434 may detect the object from at least one of the images. For example, the object may be detected from the foreground segmented by segmentation.

Next, an object verification unit 436 classifies and verifies the segmented objects.

To this end, the object verification unit 436 may use an identification method using a neural network, a support vector machine (SVM) method, an AdaBoost identification method using Haar-like features or a histograms-of-oriented-gradients (HOG) method, etc.

The object verification unit 436 may compare the detected object with the objects stored in the memory 140 to verify the object.

For example, the object verification unit 436 may verify a peripheral vehicle, a lane, a road surface, a traffic sign, a dangerous zone, a tunnel, etc. located in the vicinity of the vehicle.

The object tracking unit 440 tracks the verified object. For example, objects in the sequentially acquired images may be verified, motion or motion vectors of the verified objects may be calculated and movement of the objects may be tracked based on the calculated motion or motion vectors. Therefore, it is possible to track the peripheral vehicle, the lane, the road surface, the traffic sign, the dangerous zone, the tunnel, etc. located in the vicinity of the vehicle.

FIG. 5B is a block diagram showing another example of the internal configuration of the processor.

Referring to the figure, the processor 170 of FIG. 5B is equal to the processor 170 of FIG. 5A except for a signal processing order. Hereinafter, only the difference will be described.

The object detector 434 may receive the plurality of images or the generated around view image and detect the object from the plurality of images or the generated around view image. Unlike FIG. 5A, the object may not be detected from the segmented image but may be directly detected from the plurality of images or the generated around view image based on the disparity information.

Next, the object verification unit 436 classifies and verifies the segmented and detected object based on the image segment from the segmentation unit 432 and the object detected by the object detector 434.

To this end, the object verification unit 436 may use an identification method using a neural network, a support vector machine (SVM) method, an AdaBoost identification method using Haar-like features or a histograms-of-oriented-gradients (HOG) method, etc.

FIG. 6 is a diagram referenced to explain a method of operating the processor 170 of FIGS. 5A and 5B based on images respectively acquired in first and second frame periods.

Referring to FIG. 6, the plurality of cameras 195a, . . . , 195d sequentially acquires images FR1a and FR1b during the first and second frame periods.

The disparity calculator 420 of the processor 170 receives the images FR1a and FR1b processed by the image preprocessor 410, performs stereo matching with respect to the images FR1a and FR1b, and acquires a disparity map 520.

The disparity map 520 expresses the binocular parallax level between the stereo images FR1a and FR1b. As a disparity level increases, a distance from a vehicle decreases and, as the disparity level decreases, the distance from the vehicle increases.

When such a disparity map is displayed, as the disparity level increases, luminance increases and, as the disparity level decreases, luminance decreases.

In the figure, the disparity map 520 has disparity levels respectively corresponding to first to fourth lanes 528a, 528b, 528c and 528d, for example, disparity levels respectively corresponding to a construction area 522, a first preceding vehicle 524 and a second preceding vehicle 526.

The segmentation unit 432, the object detector 434 and the object verification unit 436 may perform segmentation, object detection and object verification with respect to at least one of the images FR1a and FR1b based on the disparity map 520.

In FIG. 6, object detection and verification are performed with respect to the second image FR1b using the disparity map 520.

That is, the first to fourth lanes 538a, 538b, 538c and 538d, the construction area 532, the first preceding vehicle 534 and the second preceding vehicle 536 are detected and verified from the image 530 as objects.

The object tracking unit 440 may track the verified objects by continuously acquiring the images.

Figure 7:
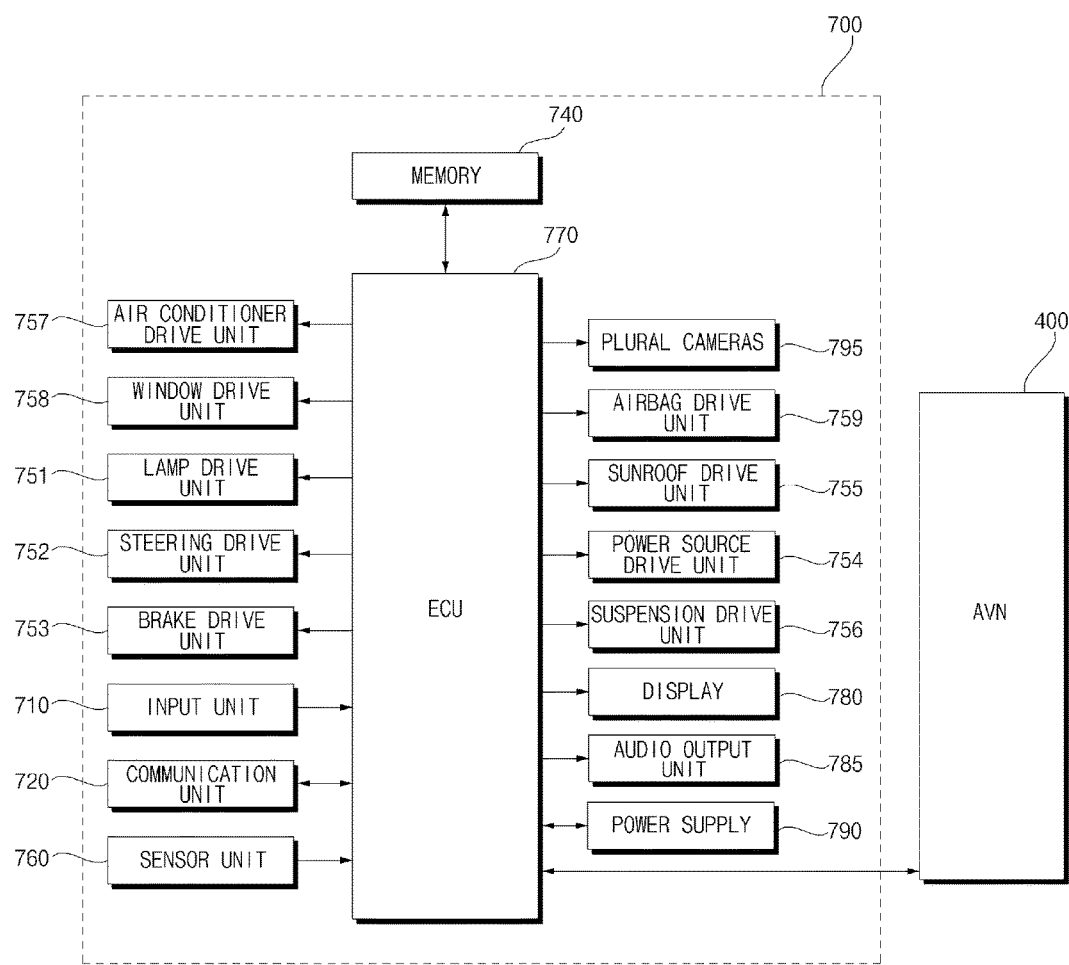
FIG. 7 is a block diagram showing the inside of a vehicle according to an embodiment of the present invention.

FIG. 7 is a block diagram showing the inside of a vehicle according to an embodiment of the present invention.

Referring to FIG. 7, the vehicle 200 may include an electronic control apparatus 700 for vehicle control. The electronic control apparatus 700 may exchange data with the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit 755, a suspension drive unit 756, an air conditioner drive unit 757, a window drive unit 758, an airbag drive unit 759, a sensor unit 760, an ECU 770, a display 780, an audio output unit 785, a power supply 790 and a plurality of cameras 795.

The ECU 770 may include a processor. Alternatively, in addition to the ECU 770, a processor for processing the images from the cameras may be further included.

The input unit 710 may include a plurality of buttons or a touchscreen provided inside the vehicle 200. Through the plurality of buttons or the touchscreen, a variety of input operations may be performed.

The communication unit 720 may exchange data with the mobile terminal 600 or the server 500 in a wireless manner. In particular, the communication unit 720 may exchange data with a mobile terminal of a vehicle driver in a wireless manner. A wireless data communication method includes various data communication methods such as BLUETOOTH, Wi-Fi Direct, Wi-Fi, APiX, etc.

For example, the communication unit 720 may receive weather information and road traffic state information, e.g., Transport Protocol Experts Group (TPEG) information, from the mobile terminal 600 or the server 500.

When a user gets into the vehicle, the mobile terminal 600 of the user and the electronic control apparatus 700 may pair with each other automatically or as the user executes an application.

The memory 740 may store a variety of data for overall operation of the electronic control apparatus 700, such as a program for processing or control of the ECU 770.

The lamp drive unit 751 may turn lamps arranged inside and outside the vehicle on or off. In addition, the lamp drive unit may control, for example, the intensity and direction of light of each lamp. For example, the lamp drive unit may perform control of a turn signal lamp or a brake lamp.

The steering drive unit 752 may perform electronic control of a steering apparatus inside the vehicle 200. The steering drive unit may change the direction of travel of the vehicle.

The brake drive unit 753 may perform electronic control of a brake apparatus (not illustrated) inside the vehicle 200. For example, the brake drive unit may reduce the speed of the vehicle 200 by controlling the operation of brakes located at wheels. In another example, the brake drive unit may adjust the direction of travel of the vehicle 200 leftward or rightward by differentiating the operation of respective brakes located at left and right wheels.

The power source drive unit 754 may perform electronic control of a power source inside the vehicle 200.

For example, in the case where a fossil fuel based engine (not illustrated) is a power source, the power source drive unit 754 may perform electronic control of the engine. Therefore, it is possible to control output torque of the engine.

In another example, in the case where an electric motor (not illustrated) is a power source, the power source drive unit 754 may perform control of the motor. As such, the power source drive unit may control, for example, the RPM and torque of the motor.

The sunroof drive unit 755 may perform electronic control of a sunroof apparatus (not illustrated) inside the vehicle 200. For example, the sunroof drive unit may control opening or closing of a sunroof.

The suspension drive unit 756 may perform electronic control of a suspension apparatus inside the vehicle 200. For example, when a road surface is uneven, the suspension drive unit may control the suspension apparatus to reduce vibration of the vehicle 200.

The air conditioner drive unit 757 may perform electronic control of an air conditioner (not illustrated) inside the vehicle 200. For example, when the interior temperature of the vehicle 200 is high, the air conditioner drive unit may operate the air conditioner to supply cold air to the interior of the vehicle 200.

The window drive unit 758 may perform electronic control of a window apparatus inside the vehicle 200. For example, the window drive unit may control opening or closing of left and right windows of the vehicle 200.

The airbag drive unit 759 may perform the electronic control of an airbag apparatus inside the vehicle 200. For example, the airbag drive unit may control an airbag to be deployed in a dangerous situation.

The sensing unit 760 is configured to sense signals associated with traveling of the vehicle 100. To this end, the sensing unit 760 may include a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, etc.

As such, the sensing unit 760 may acquire sensing signals with regard to, for example, vehicle traveling direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The ECU 770 may control overall operation of the units of the electronic control apparatus 700.

The ECU may perform specific operation based on input received through the input unit 710 or receive and transmit the signal sensed by the sensor unit 760 to the around view provision apparatus 100, receive map information from the AVN apparatus 400 and control operations of the drive units 751, 752, 753, 754 and 756.

In addition, the ECU 770 may receive weather information and road traffic state information, e.g., Transport Protocol Experts Group (TPEG) information, from the communication unit 720.

The ECU 770 may synthesize a plurality of images received from the plurality of cameras 795 to generate an around view image. In particular, when the speed of the vehicle is equal to or less than a predetermined speed or when the vehicle is reversed, the around view image may be generated.

The display 780 may display the generated around view image. In particular, various user interface may be provided in addition to the around view image.

For display of the around view image, the display 780 may include a cluster or a head up display (HUD) located at the internal front side of the vehicle. When the display 780 is a HUD, a projection module for projecting an image onto the windshield of the vehicle 200 may be included. The display 780 may include a touchscreen capable of performing an input function.

The audio output unit 785 converts an electrical signal from the ECU 770 into an audio signal and outputs the audio signal. The audio output unit may include a speaker. The audio output unit 785 may output sound corresponding to operation of the input unit 110, that is, a button.

The power supply 790 may supply power required to operate the respective components under control of the ECU 770. In particular, the power supply 790 may receive power from, for example, a battery (not illustrated) inside the vehicle.

The plurality of cameras 795 is used to provide the around view image and may include four cameras as shown in FIG. 2A. For example, the plurality of around view cameras 195a, 195b, 195c and 195d may be disposed at the left, rear, right and front sides of the vehicle. The plurality of images captured by the plurality of cameras 795 may be delivered to the ECU 770 or the processor (not shown).

Although not shown in the figure, the electronic control apparatus 700 of the vehicle 200 may include the image projector 187 of FIG. 3A or 3B.

Upon driving or parking the vehicle, the location of at least one of the plurality of around view cameras 195a, 195b, 195c and 195d may be changed.

For example, upon driving the vehicle, if impulse upon passing over a speed bump is equal to or greater than a predetermined value, the location of at least one of the plurality of around view cameras 195a, 195b, 195c and 195d may be changed.

As another example, the location of at least one of the left camera 195a and the right camera 195c disposed at the side-view mirrors may be changed by a pedestrian or another vehicle parked adjacent thereto in a state in which the vehicle is parked.

In a state in which the location of at least one of the plurality of around view cameras 195a, 195b, 195c and 195d is changed, when the processor 170 synthesizes the images captured by the cameras to generate the around view image, edge increase or image breaking may be generated in a boundary area between the images.

In the present invention, in order to prevent this phenomenon, auto-calibration is performed with respect to the plurality of around view cameras 195a, 195b, 195c and 195d.

For example, calibration may be performed with respect to the images captured by the plurality of around view cameras 195a, 195b, 195c and 195d and the around view image may be generated based on the calibrated images, which will be described with reference to FIGS. 7 to 10.

As another example, the reference images and the images captured by the plurality of around view cameras 195a, 195b, 195c and 195d may be compared, offset information may be calculated, and the around view image may be generated using the calculated offset information, which will be described with reference to FIGS. 11 to 14.

Figure 8:
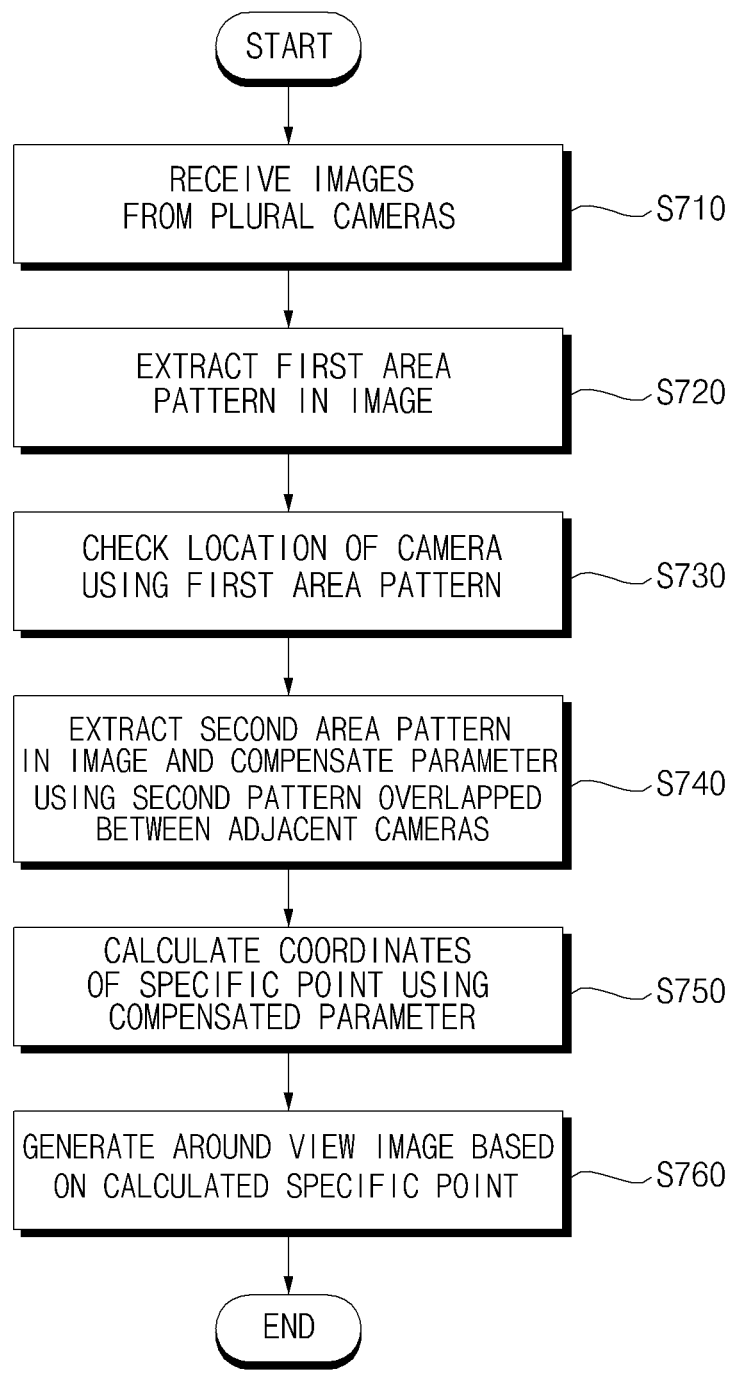
FIG. 8 is a flowchart illustrating a method of operating an around view provision apparatus according to an embodiment of the present invention.

FIG. 8 is a flowchart illustrating a method of operating an around view provision apparatus according to an embodiment of the present invention.

Referring to FIG. 8, the processor 170 of the around view provision apparatus 100 receives a plurality of images 820a to 820d captured by the plurality of around view cameras 195a, 195b, 195c and 195d (S710).

As shown in FIG. 2A, the plurality of around view cameras 195a, 195b, 195c and 195d may be disposed at the left, rear, right and front sides of the vehicle.

In particular, the left camera 195a and the right camera 915c may be disposed in a case surrounding a left side-view mirror and a case surrounding a right side-view mirror, respectively.

The rear camera 195b and the front camera 195d may be disposed near a trunk switch or on or near an emblem.

The plurality of images captured by the plurality of around view cameras 195a, 195b, 195c and 195d is delivered to the processor 170 of the around view provision apparatus 100.

Next, the processor 170 of the around view provision apparatus 100 may extract first area patterns in the plurality of images 820a to 820d (S720), for image calibration, when the plurality of images 820a to 820d captured by the plurality of around view cameras 195a, 195b, 195c and 195d is received.

Such image calibration may be performed upon startup of the vehicle, upon manipulating the side-view mirror or when impulse upon driving the vehicle is equal to or greater than a predetermined value.

Such image calibration may be performed when the speed of the vehicle is equal to or less than a predetermined speed or when the vehicle is reversed.

The first area patterns may be located in the front, rear, left and right areas of the vehicle 200 and may include a checker board pattern.

Next, the processor 170 of the around view provision apparatus 100 may check the locations of the cameras using the first area patterns in the plurality of images 820a to 820d (S730).

Next, the processor 170 of the around view provision apparatus 100 may extract second area patterns in the plurality of images 820a to 820d and compensate a parameter using the second area patterns overlapped between adjacent cameras (S740).

The second area patterns may be located at corner areas of the vehicle 200 and may include a checker board pattern.

The parameter may include at least one of a focal length parameter, a horizontal translation parameter, a vertical translation parameter, a longitudinal translation parameter, a pitch rotation parameter, a roll rotation parameter, a yaw rotation parameter and a camera intrinsic parameter.

Next, the processor 170 of the around view provision apparatus 100 may calculate coordinates of a specific point based on the compensated parameter (S750).

The specific point may correspond to the boundary of the checker board pattern in the second area pattern.

Next, the processor 170 of the around view provision apparatus 100 may generate an around view image based on the calculated specific point (S760).

That is, the processor 170 of the around view provision apparatus 100 may receive the plurality of images 820a to 820d from the plurality of cameras 195a to 195d, check the location of each image using the first area patterns 810a of the plurality of images 820a to 820d, compensate the parameter of each image using the second area patterns 810b located in overlapping areas between the plurality of images 820a to 820d, and generate the around view image based on the compensated parameter. Therefore, it is possible to provide an accurate around view image based on the calibrated image.

The processor 170 may calculate the coordinates of the specific image based on the compensated parameter and generate the around view image based on the calculated coordinates.

In particular, the processor 170 may calculate the coordinates of the specific point in the overlapping areas between the plurality of images 820a to 820d based on the compensated parameter, and synthesize the plurality of images 820a to 820d to generate the around view image based on the calculated coordinates, thereby providing an accurate around view image based on the calibrated image.

Figure 9A:
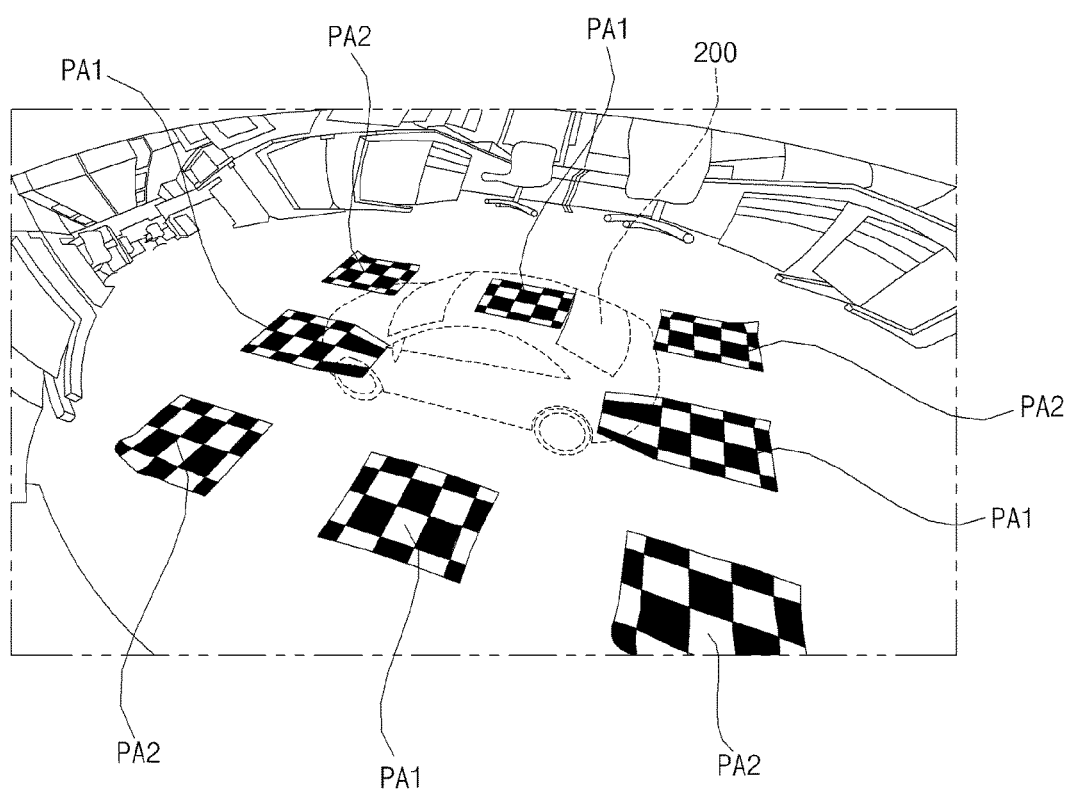
FIGS. 9A to 10 are views referenced to explain the operating method of FIG. 8.
Figure 9B:
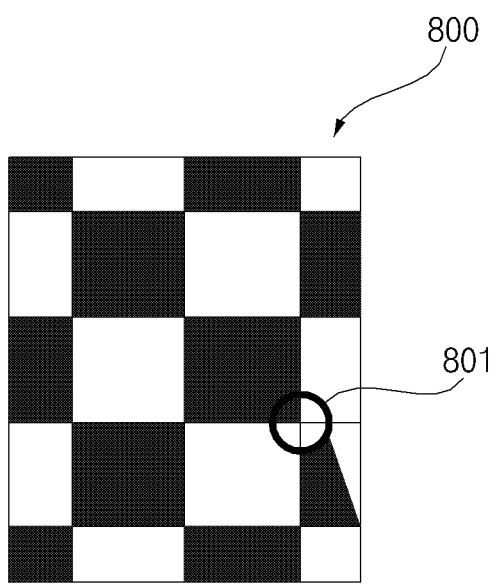
Figure 9C:
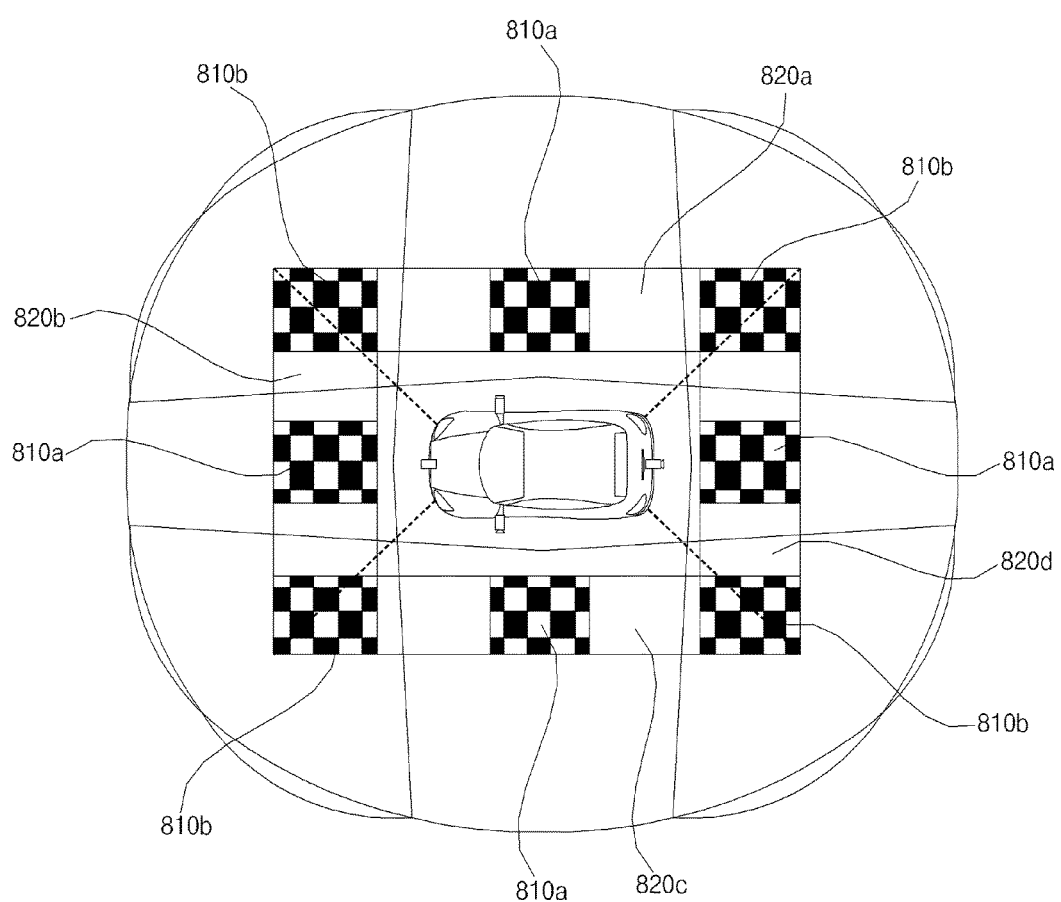
Figure 10:
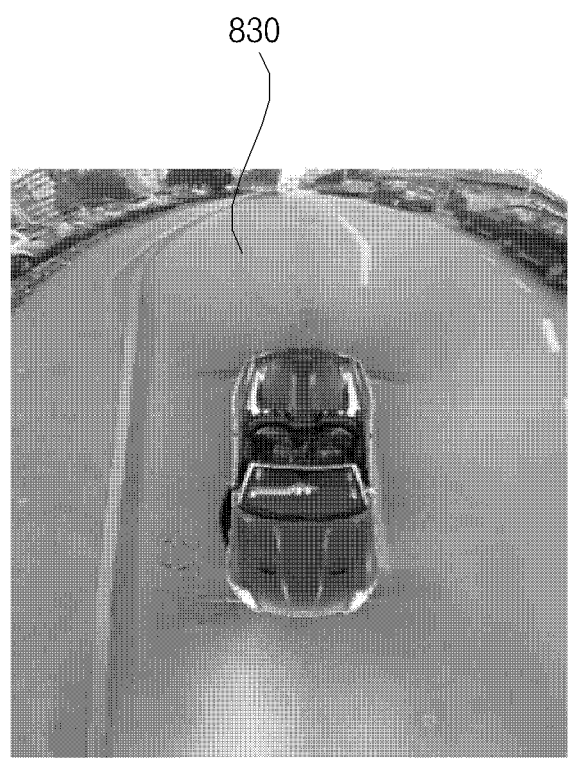

FIGS. 9A to 10 are views referenced to explain the operating method of FIG. 8.

First, FIG. 9A shows a plurality of markers PA1 and PA2 provided in the periphery of a vehicle.

The plurality of markers PA1 and PA2 may be provided in a specific space, for calibration of the around view provision apparatus 100.

For example, the markers may be provided in a personal parking space.

The plurality of markers PA1 and PA2 may be projected images output from the image projector 187, for calibration of the around view provision apparatus 100.

The plurality of markers PA1 and PA2 may include four first markers PA1 located in the front, rear, left and right areas of the vehicle 200 and four second markers PA2 located at the corner areas of the vehicle.

FIG. 9B shows the marker 800 in greater detail.

The marker 800 may include a checker board pattern. As shown in FIG. 9B, 20 rectangles may be provided and black rectangles and white rectangles are alternately provided.

In the present invention, calibration is performed with respect to the image captured by the camera, using the boundary of the checker board pattern, that is, the boundary 801 between the black rectangle and the white rectangle.

FIG. 9C is a diagram showing the plurality of images 820a to 820d acquired by the plurality of cameras 195a to 195d.

Referring to the figure, the plurality of images 820a to 820d may be acquired from the plurality of around view cameras 195a, 195b, 195c and 195d disposed at the left, rear, right and front sides of the vehicle.

Each of the plurality of images 820a to 820d may include the first area pattern 810a and the second area pattern 810b.

The processor 170 of the around view provision apparatus 100 may receive the plurality of images 820a to 820d from the plurality of around view cameras 195a, 195b, 195c and 195d and check the location of each image using the first area patterns 810a in the plurality of images 820a to 820d.

That is, the processor 170 of the around view provision apparatus 100 may check the plurality of images 820a to 820d from the left camera 195a, the rear camera 195b, the right camera 195c and the front camera 195d using the first area patterns 810a of the plurality of images 820a to 820d.

Next, the processor 170 of the around view provision apparatus 100 compensates the parameter of each image using the second area patterns 810b located in the overlapping areas between the plurality of images 820a to 820d.

In particular, the processor 170 of the around view provision apparatus 100 may compare a plurality of adjacent images in the boundary areas (the areas corresponding to 801 of FIG. 9B) between the checker board patterns of the second area patterns 810b, check a difference between the images, and compensate the parameter of the image in order to compensate the difference.

For example, if an error is generated in a horizontal component, the processor 170 of the around view provision apparatus 100 may compensate the horizontal translation parameter.

For example, if an error is generated in a vertical component, the processor 170 of the around view provision apparatus 100 may compensate the vertical translation parameter.

For example, if an error is generated in a longitudinal direction, the processor 170 of the around view provision apparatus 100 may compensate the longitudinal translation parameter.

For example, if an error is generated in a pitch component, the processor 170 of the around view provision apparatus 100 may compensate the pitch rotation parameter.

For example, if an error is generated in a roll component, the processor 170 of the around view provision apparatus 100 may compensate the roll rotation parameter.

For example, if an error is generated in a yaw component, the processor 170 of the around view provision apparatus 100 may compensate the yaw rotation parameter.

The processor 170 of the around view provision apparatus 100 may calibrate the plurality of images based on the compensated parameters and synthesize the calibrated images to generate an around view image.

FIG. 10 shows an around view image 830 generated based on the calibrated images obtained by performing calibration with respect to the plurality of images.

Therefore, it is possible to provide an accurate around view image.

The processor 170 of the around view provision apparatus 100 may calculate the coordinates of a specific point based on the compensated parameter and generate the around view image based on the calculated coordinates.

The specific point may correspond to the boundary area (the area corresponding to 801 of FIG. 9B) of the checker board pattern of each second area pattern 810*b*.

The processor 170 of the around view provision apparatus 100 may calculate the coordinates of the specific point in the area overlapped between the plurality of images 820*a* to 820*d* based on the compensated parameter and synthesize the plurality of images 820*a* to 820*d* to generate the around view image based on the calculated coordinates.

The processor 170 of the around view provision apparatus 100 may receive reverse movement information or speed information of the vehicle from the ECU of the vehicle and then output the projected image including the first area patterns 810*a* and the second area patterns 810*b* to the outside of the vehicle 200 if the vehicle 200 is reversed or if the speed of the vehicle is equal to or less than a predetermined speed.

The processor 170 of the around view provision apparatus 100 may compensate the parameter of the image using the first area patterns 810*a* and the second area patterns 810*b* included in the projected image and generate the around view image based on the compensated parameter, as described with reference to FIGS. 9A to 9C. Therefore, it is possible to generate and provide an accurate around view image.

Figure 11:
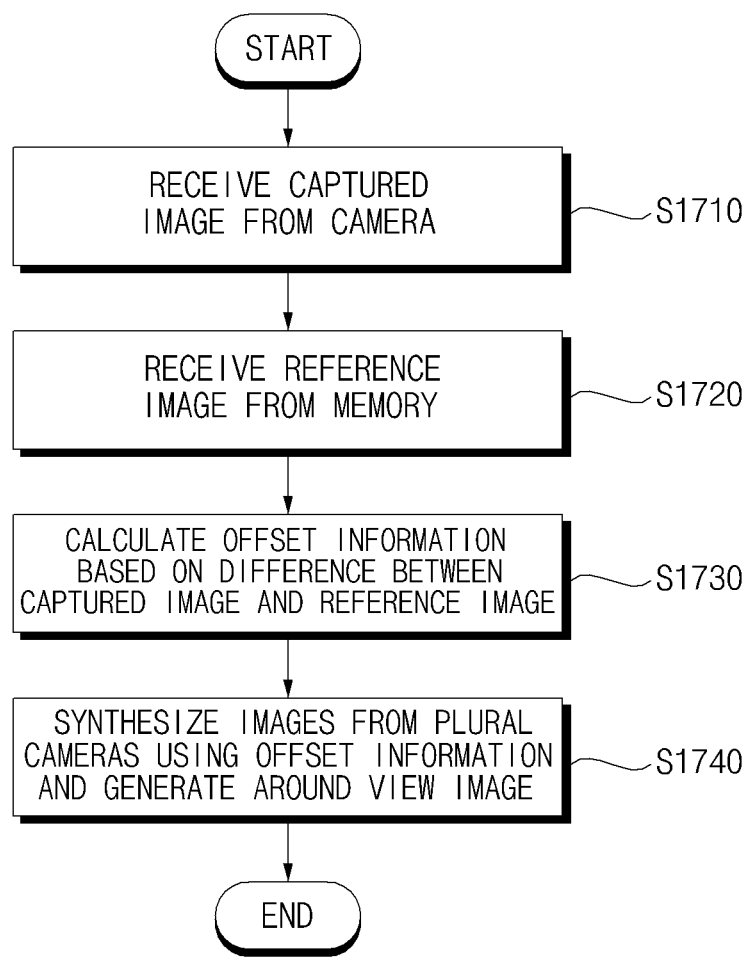
FIG. 11 is a flowchart illustrating a method of operating an around view provision apparatus according to an embodiment of the present invention.

FIG. 11 is a flowchart illustrating a method of operating an around view provision apparatus according to an embodiment of the present invention, and FIGS. 12A to 13D are views referenced to explain the operating method of FIG. 11.

First, referring to FIG. 11, the processor 170 of the around view provision apparatus 100 receives the images captured by the plurality of around view cameras 195*a*, 195*b*, 195*c* and 195*d* (S1710).

As shown in FIG. 2A, the plurality of around view cameras 195*a*, 195*b*, 195*c* and 195*d* may be disposed at the left, rear, right and front sides of the vehicle.

In particular, the left camera 195*a* and the right camera 915*c* may be disposed in a case surrounding a left side-view mirror and a case surrounding a right side-view mirror, respectively.

The rear camera 195*b* and the front camera 195*d* may be disposed near a trunk switch or on or near an emblem.

The plurality of images captured by the plurality of around view cameras 195*a*, 195*b*, 195*c* and 195*d* may be delivered to the processor 170 of the vehicle 200.

Next, the processor 170 of the around view provision apparatus 100 receives the reference image of each of the plurality of around view cameras 195*a*, 195*b*, 195*c* and 195*d* from the memory 140 (S1720).

The processor 170 of the around view provision apparatus 100 may make a request to transmit the reference image of each of the plurality of around view cameras 195*a*, 195*b*, 195*c* and 195*d* from the memory 140, for image calibration, when the plurality of images captured by the plurality of around view cameras 195*a*, 195*b*, 195*c* and 195*d* is received.

Such image calibration may be performed upon startup of the vehicle, upon manipulating the side-view mirror or when impulse upon driving the vehicle is equal to or greater than a predetermined value.

The memory 140 may transmit the reference image in response to the request to transmit the reference image. A reference image related to a parking lot may be transmitted upon startup of the vehicle, and a reference image including an area including a vehicle or an image including a lane may be transmitted upon manipulating the side-view mirror or when impulse upon driving the vehicle is equal to or greater than a predetermined value.

Next, the processor 170 of the around view provision apparatus 100 calculates offset information based on a difference between the captured image and the reference image (S1730).

The processor 170 may calculate the offset information based on the difference between a character line in the reference image and a character line in the captured image, if each of the reference image and the captured image includes the character line of the vehicle.

Here, the character line of the vehicle may include a hood emblem, a hood edge line, etc.

The processor 170 may calculate the offset information based on a difference between an object in the reference image and an object in the captured image, if each of the reference image and the captured image includes the object located outside the vehicle.

Here, the object located outside the vehicle may include at least one of a parking curb of a parking lot, a pillar, or a traffic sign, a traffic light, a street lamp, etc.

The processor 170 may perform control to output a notification message indicating that an around view image cannot be generated through the output unit (not shown) including the audio output unit 185 or the display 180, if the offset information is equal to or greater than a predetermined value.

The processor 170 may calculate information if impulse upon startup of the vehicle, upon manipulating the side-view mirror or upon driving the vehicle is equal to or greater than a predetermined value.

The processor 170 may calculate first offset information based on the reference image of the first camera of the first to fourth cameras 195*a*, . . . , 195*d* and the captured image from the first camera 195*a* and apply the first offset information to at least some of the second to fourth cameras. Accordingly, it is possible to conveniently use common offset information even when the location of a camera is changed.

Next, the processor 170 of the around view provision apparatus 100 synthesizes the images captured by the plurality of around view cameras 195*a*, 195*b*, 195*c* and 195*d* using the offset information to generate the around view image (S1740).

The processor 170 may perform control to display the calibrated around view image through the display 180.

At this time, the processor 170 may perform control to display an area calibrated by the offset information on the around view image displayed on the display 180 or to display an amount of calibration. Therefore, it is possible to increase user convenience.

The processor 170 may perform control to display the around view image generated using the offset information and a second around view image generated without using the offset information on the display 180.

The processor 170 may perform control to continuously generate the around view image using the offset information, if the around view image is selected from between the around view image and the second around view displayed on the display 180. Therefore, it is possible to increase user convenience.

When user input is received in a state in which the around view image and the area calibrated by the offset information displayed on the around view image are displayed on the display 180 or in a state of displaying the amount of calibration, the processor 170 may perform control to change at least one of the calibrated area, the amount of calibration or the offset information in correspondence with user input. Therefore, it is possible to increase user convenience.

Figure 12A:
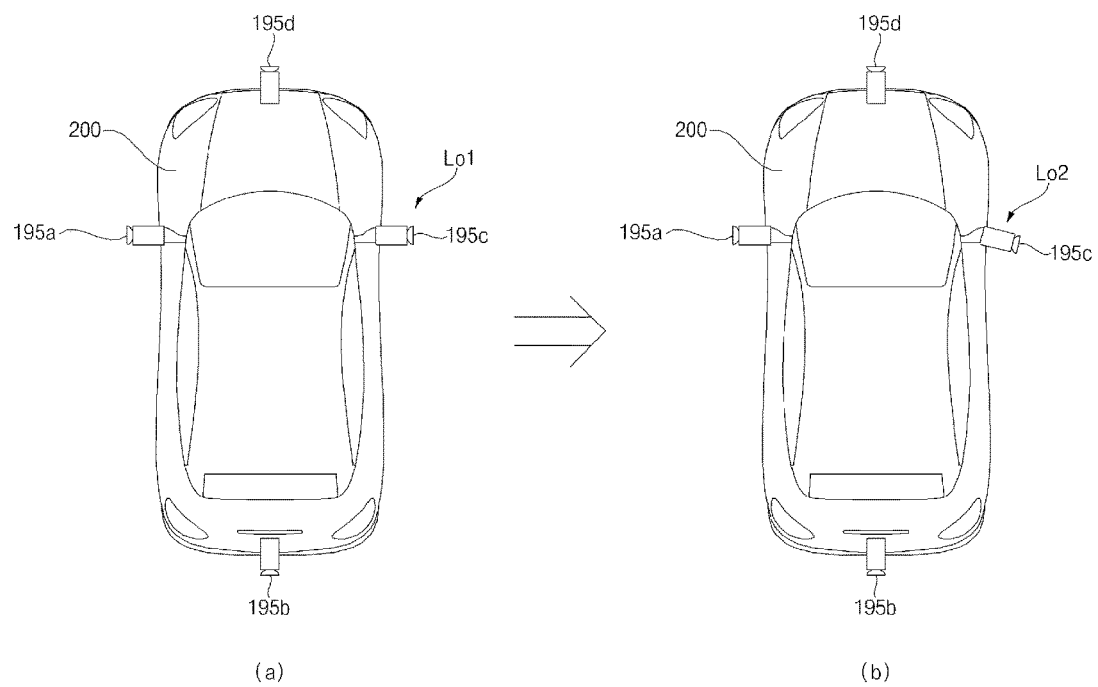
FIGS. 12A to 13D are views referenced to explain the operating method of FIG. 11.
Figure 12B:
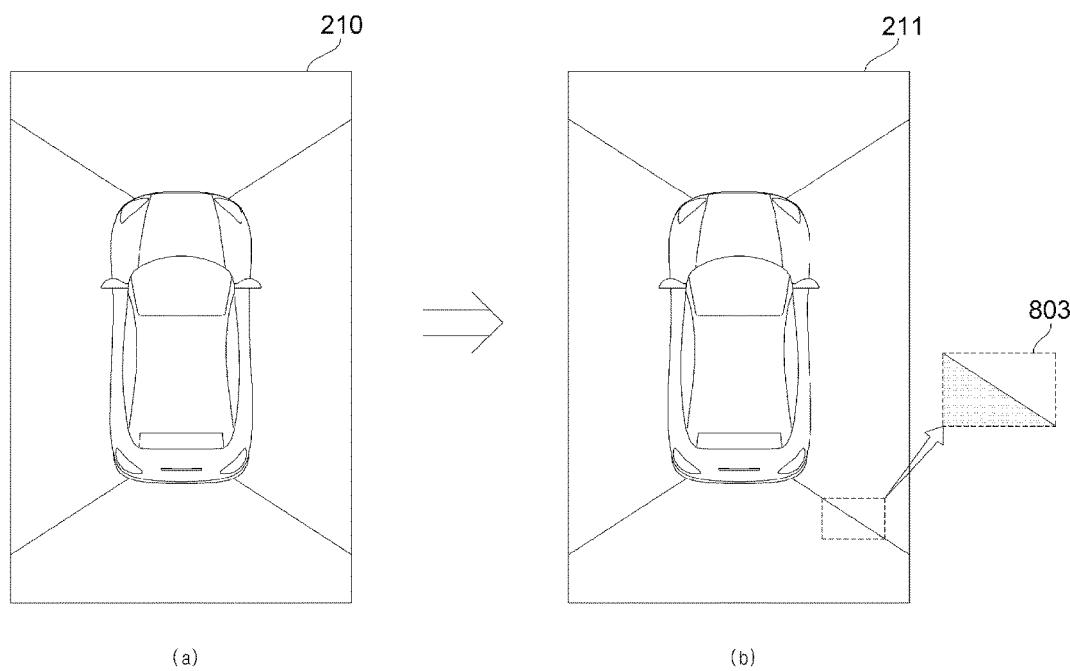

FIGS. 12A and 12B show the case where the location of the right camera 195c of the plurality of cameras 195a, 195b, 195c and 195d is changed and thus a portion of the generated around view image is broken.

First, FIG. 12A shows the case where the location of the right camera 195c of the plurality of cameras 195a, 195b, 195c and 195d is changed. In particular, the location of the camera 195c is changed from the right side Lo1, as shown in (a) of FIG. 12A, to the right rear side Lo2 as shown in (b) of FIG. 12B.

If the location of the right camera 195c is changed, an image breaking phenomenon is generated in the vicinity of the boundary area between images upon generating the around view image.

(a) of FIG. 12B shows an around view image 210 when the location of the right camera 195c is not changed and (b) of FIG. 12B shows an around view image 210 when the location of the right camera 195c is changed to the right rear side.

(b) of FIG. 12B shows image breaking or edge increase in the boundary area 803 between the image of the rear camera 195b and the image of the right camera 195c. When the driver views the around view image 211, the driver finds that the boundary area 803 is unnatural.

In the present invention, in order to solve this problem, the reference image and the captured image are compared or reference location information and current location information of the camera are compared using a gyroscope sensor.

Figure 13A:
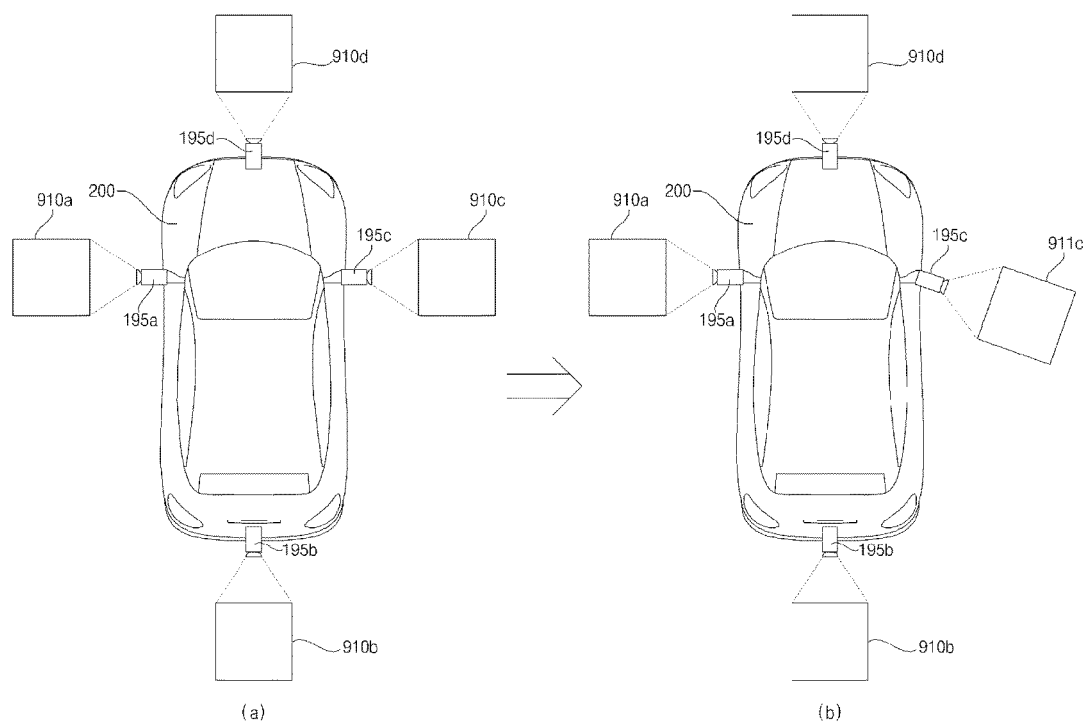

FIG. 13A shows an image captured when the location of the right camera 195c is not changed and an image captured when the location of the right camera 195c is changed to the right rear side.

(a) of FIG. 13A shows captured images 910a, 910b, 910c and 910d acquired by the plurality of around view cameras 195a, 195b, 195c and 195d.

(b) of FIG. 13A shows captured images 910a, 910b, 911c and 910d acquired by the plurality of around view cameras 195a, 195b, 195c and 195d.

In comparison between (a) and (b) of FIG. 13A, it can be seen that, when the location of the right camera 195c is changed to the right rear side, the captured images 910c and 911c are different from each other.

The processor 170 may calculate the offset information using such a difference.

Figure 13B:
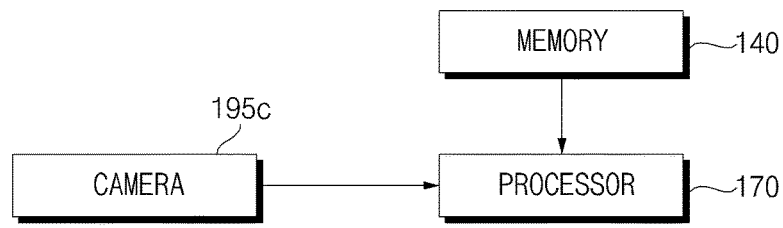

That is, as shown in FIG. 13B, the processor 170 may receive the reference image of the right camera, for example, the image 910c of (a) of FIG. 13A, from the memory 140 and receive the captured image 911c from the right camera 195c.

The processor 170 may calculate a difference between the reference image 910c and the captured image 911c and calculate offset information based on the difference. That is, when the location of the right camera 195c is changed to the right rear side, offset information for calibrating a portion of the captured image to the left front side may be calculated.

Figure 13C:
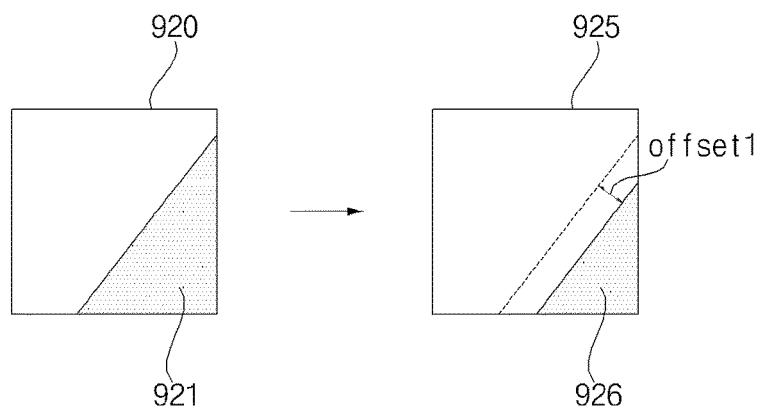

FIG. 13C shows another example of a reference image and a captured image.

FIG. 13C shows the case where a predetermined object 921 is included in a reference image 920 and the case where an object 926 in an image 925 captured by the right camera 195c is shifted to the right rear side.

The processor 170 may calculate a difference between the reference image 920 and the captured image 925 and calculate offset information offset1 based on the difference. That is, based on the difference between the locations of the objects 921 and 926, offset information offset 1 for calibrating a portion of the captured image 925 to the left front side may be calculated.

The processor 170 may calibrate the captured image 925 using the calculated offset information offset1 to be equal to the reference image 920.

Figure 13D:
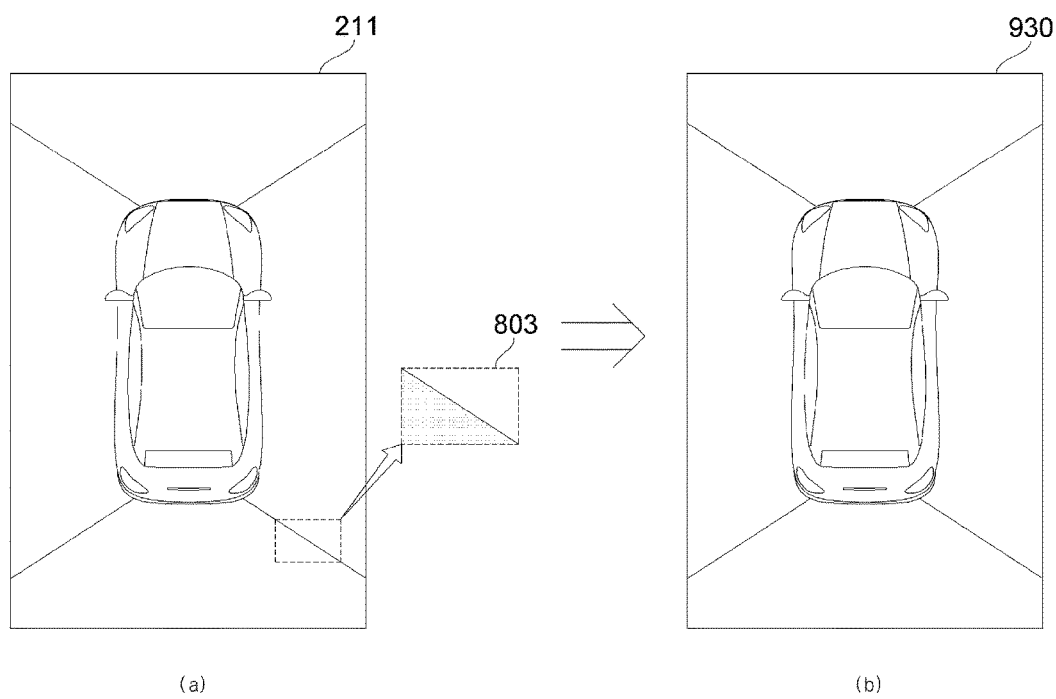

(a) of FIG. 13D shows image breaking or edge increase in a boundary area 803 between an image of the rear camera 195b and an image of the right camera 195c in an around view image 211.

(b) of FIG. 13D shows an around view image 930 calibrated by the processor 170 based on offset information. Therefore, a natural image is generated in the boundary area 803 without an image breaking phenomenon. Accordingly, the around view provision apparatus may provide an accurate around view image based on the calibrated image.

The processor 170 may perform control to apply calculated first offset information to the second and third cameras adjacent to the first camera.

That is, the processor 170 may perform control to perform calibration with respect to the rear camera 195b and the front camera 195d adjacent to the right camera 195c using the calculated offset information offset1.

For example, the processor 170 may partially apply the calculated offset information offset1 to the image captured by the front camera 195d or the rear camera 195b to acquire the calibrated image. Based on these images, the around view image may be generated.

As apparent from the above description, an around view provision apparatus and a vehicle including the same according to the embodiments of the present invention includes a plurality of cameras mounted on a vehicle, a display, and a processor configured to receive a plurality of images from the plurality of cameras, to check locations of the images using first area patterns in the plurality of images, to compensate a parameter in an image using second area patterns located in overlapping areas between the plurality of images, and to generate an around view image based on the compensated parameter. Accordingly, it is possible to provide an accurate around view image based on a calibrated image.

In particular, the processor calculates the coordinates of a specific point in the overlapping areas between the plurality of images based on the compensated parameter and synthesizes the plurality of images to generate the around view image based on the calculated coordinates. Accordingly, it is possible to provide an accurate around view image based on a calibrated image.

The processor calculates offset information of at least some of the plurality of cameras based on a difference between the reference image corresponding to each of the plurality of cameras from a memory and a captured image from each of the plurality of cameras and synthesizes the images from the plurality of cameras using the offset information to generate the around view image. Accordingly, it is possible to provide an accurate around view image based on a calibrated image.

The around view provision apparatus or the method of operating the same according to the present invention may be implemented as code that can be written to a processor-readable recording medium provided in the vehicle driving assistance device or the vehicle and can thus be read by a processor. The processor-readable recording medium may be any type of recording device in which data can be stored in a computer-readable manner. Examples of the processor-readable recording medium include a ROM, a RAM, a CD-ROM, a magnetic tape, a floppy disk, optical data storage, and a carrier wave (e.g., data transmission over the Internet). The processor-readable recording medium may be distributed to a plurality of computer systems connected to a network so that processor-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

What is claimed is:

1. An image provision apparatus comprising:
   a plurality of cameras mounted on a vehicle and configured to capture images;
   a memory configured to store a reference image of each of the plurality of cameras;
   a display configured to display information; and
   a processor configured to:
   receive a plurality of images from the plurality of cameras;
   check a location of each of the plurality of images using first area patterns in the plurality of images;
   compensate a parameter in an image using second area patterns located in overlapping areas of the image at which at least two of the plurality of images partially overlap;
   cause the display to display an image generated based on the compensated parameter;
   calculate offset information of at least some of the plurality of cameras based on a difference between at least one stored reference image and at least one image captured from a corresponding at least one of the plurality of cameras;
   synthesize the plurality of images from the plurality of cameras using the calculated offset information to generate the image, wherein each of the at least one reference image and the at least one captured image includes a character line of the vehicle; and
   calculate the offset information based on a difference between the character line in the at least one reference image and the character line in the at least one captured image.

2. The apparatus according to claim 1, wherein the processor is further configured to:
   calculate coordinates of a specific point based on the compensated parameter; and
   generate the image based on the calculated coordinates.

3. The apparatus according to claim 2, wherein the processor is further configured to:
   calculate the coordinates of the specific point in the overlapping areas based on the compensated parameter; and
   synthesize the plurality of images based on the calculated coordinates to generate the image.

4. The apparatus according to claim 1, wherein:
   the first area patterns are located in front, rear, left and right areas of the vehicle; and
   the second area patterns are located in corner areas of the vehicle.

5. The apparatus according to claim 1, wherein each of the first area patterns and second area patterns includes a checker board pattern.

6. The apparatus according to claim 1, further comprising an image projector configured to output the generated image external to the vehicle,
   wherein the processor is further configured to cause the image projector to output the image including the first area patterns and second area patterns when the vehicle is in a reverse gear or when a speed of the vehicle is equal to or less than a predetermined speed.

7. The apparatus according to claim 1, wherein the processor is further configured to:
   calculate first offset information based on a reference image of a first camera of the plurality of cameras and an image captured from the first camera; and
   apply the calculated first offset information to cameras of the plurality of cameras other than the first camera.

8. An image provision apparatus comprising:
   a plurality of cameras mounted on a vehicle and configured to capture images;
   a memory configured to store a reference image of each of the plurality of cameras;
   a display configured to display information; and
   a processor configured to:
   receive a plurality of images from the plurality of cameras;
   check a location of each of the plurality of images using first area patterns in the plurality of images;
   compensate a parameter in an image using second area patterns located in overlapping areas of the image at which at least two of the plurality of images partially overlap;
   cause the display to display an image generated based on the compensated parameter;
   calculate offset information of at least some of the plurality of cameras based on a difference between at least one stored reference image and at least one image captured from a corresponding at least one of the plurality of cameras;
   synthesize the plurality of images from the plurality of cameras using the calculated offset information to generate the image; and
   cause output of a notification message indicating that the image cannot be generated when the offset information is equal to or greater than a predetermined value.

9. A vehicle comprising:
   a steering drive unit configured to drive a steering apparatus;
   a brake drive unit configured to drive a brake apparatus;
   a power source drive unit configured to drive a power source;
   a plurality of cameras mounted on the vehicle and configured to capture images;
   a memory configured to store a reference image of each of the plurality of cameras;
   a display configured to display information; and
   a processor configured to:
   receive a plurality of images from the plurality of cameras;
   check a location of each of the plurality of images using first area patterns in the plurality of images;
   compensate a parameter in an image using second area patterns located in overlapping areas of the image at which at least two of the plurality of images partially overlap;

cause the display to display an image generated based on the compensated parameter;

calculate offset information of at least some of the plurality of cameras based on a difference between at least one stored reference image and at least one image captured from a corresponding at least one of the plurality of cameras;

synthesize the plurality of images from the plurality of cameras using the calculated offset information to generate the image, wherein each of the at least one reference image and the at least one captured image includes a character line of the vehicle; and calculate the offset information based on a difference between the character line in the at least one reference image and the character line in the at least one captured image.

10. The vehicle according to claim 9, wherein the processor is further configured to:

calculate coordinates of a specific point based on the compensated parameter; and generate the image based on the calculated coordinates.

11. The vehicle according to claim 10, wherein the processor is further configured to:

calculate the coordinates of the specific point in the overlapping areas based on the compensated parameter; and synthesize the plurality of images based on the calculated coordinates to generate the image.

12. The vehicle according to claim 9, wherein:

the first area patterns are located in front, rear, left and right areas of the vehicle; and the second area patterns are located in corner areas of the vehicle.

13. The vehicle according to claim 9, wherein each of the first area patterns and second area patterns includes a checker board pattern.

14. The vehicle according to claim 9, further comprising an image projector configured to output the generated image external to the vehicle, wherein the processor is further configured to cause the image projector to output the image including the first area patterns and second area patterns when the vehicle is in a reverse gear or when a speed of the vehicle is equal to or less than a predetermined speed.

15. The vehicle according to claim 9, wherein the processor is further configured to:

calculate first offset information based on a reference image of a first camera of the plurality of cameras and an image captured from the first camera; and apply the calculated first offset information to cameras of the plurality of cameras other than the first camera.

16. The vehicle according to claim 9, wherein the processor is further configured to cause output of a notification message indicating that the image cannot be generated when the offset information is equal to or greater than a predetermined value.

* * * * *